(12) United States Patent
Kim et al.

(10) Patent No.: US 8,036,478 B2
(45) Date of Patent: Oct. 11, 2011

(54) COLOR IMAGE RESIDUE TRANSFORMATION AND/OR INVERSE TRANSFORMATION METHOD AND APPARATUS, AND COLOR IMAGE ENCODING AND/OR DECODING METHOD AND APPARATUS USING THE SAME

(75) Inventors: Woo-shik Kim, Gyeonggi-do (KR); Hyun-mun Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1131 days.

(21) Appl. No.: 10/996,448

(22) Filed: Nov. 26, 2004

(65) Prior Publication Data

US 2005/0111741 A1    May 26, 2005

(30) Foreign Application Priority Data

Nov. 26, 2003 (KR) .......... 10-2003-0084714
Jul. 6, 2004 (KR) .......... 10-2004-0052322
Nov. 18, 2004 (KR) .......... 10-2004-0094554

(51) Int. Cl.
  G06K 9/36    (2006.01)
  G06K 9/46    (2006.01)
(52) U.S. Cl. ........ 382/248; 382/166; 382/244; 382/232; 382/251
(58) Field of Classification Search .......... 382/165, 382/166, 236, 244, 248, 232, 251; 345/98, 345/589; 348/441, 699; 375/240.16, 240.24
See application file for complete search history.

(56) References Cited

U.S. PATENT DOCUMENTS 4,581,638 A * 4/1986 Chiariglione et al. ... 375/240.24

(Continued)

FOREIGN PATENT DOCUMENTS

EP    0661886    * 12/1994

(Continued)

OTHER PUBLICATIONS domanski et al. "Lossless and Near Lossless Image Compression with Color Transformations", pp. 454-457.*

(Continued)

*Primary Examiner* — Jason M Repko
*Assistant Examiner* — Mia M Thomas
(74) *Attorney, Agent, or Firm* — Staas & Halsey LLP

(57) ABSTRACT

A color image residue transform and/or inverse transform method and apparatus, and a color image encoding and/or decoding method and apparatus using the same are provided. The residue transform method includes: obtaining a residue corresponding to the difference of an original image and a predicted image; and transforming the residue by using a relation between residues of color image components. The residue inverse transform method includes: generating a residue for each component by performing residue inverse transform of the residue transformed original image; and restoring the original image by adding a predicted image to the residue of each component. Also, the color image lossless encoding method using the residue transform includes: obtaining a residue corresponding to the difference of an original image and a predicted image; and performing encoding by transforming the residue by using the relation between residues of predetermined components. The decoding method includes: extracting residue transformed image data from the coded data of the original image; generating a residue for each component by performing residue inverse transform of the residue transformed image data; and restoring the original image by adding a predicted image to the residue of each component. According to the methods and apparatuses, by performing transform between residues of each color component, the redundancy of the residue of each color component is removed such that when a color image is encoded, a higher compression efficiency can be achieved.

32 Claims, 15 Drawing Sheets

U.S. PATENT DOCUMENTS

| | | | | |
|---|---|---|---|---|
| 4,751,742 | A * | 6/1988 | Meeker | 382/240 |
| 4,937,681 | A * | 6/1990 | Fujinawa et al. | 382/234 |
| 4,954,892 | A * | 9/1990 | Asai et al. | 375/240.23 |
| 5,122,873 | A * | 6/1992 | Golin | 375/240.23 |
| 5,412,741 | A * | 5/1995 | Shapiro | 382/232 |
| 5,414,527 | A * | 5/1995 | Koshi et al. | 382/239 |
| 5,465,164 | A * | 11/1995 | Sugiura et al. | 382/252 |
| 5,513,128 | A * | 4/1996 | Rao | 382/232 |
| 5,570,132 | A * | 10/1996 | De With et al. | 375/240.18 |
| 5,627,917 | A * | 5/1997 | Chen | 382/246 |
| 5,724,451 | A * | 3/1998 | Shin et al. | 382/240 |
| 5,748,244 | A * | 5/1998 | Jung | 375/240.18 |
| 5,748,245 | A * | 5/1998 | Shimizu et al. | 375/240.03 |
| 5,761,342 | A * | 6/1998 | Yoshida | 382/234 |
| 5,838,826 | A * | 11/1998 | Enari et al. | 382/234 |
| 5,974,184 | A * | 10/1999 | Eifrig et al. | 382/236 |
| 6,021,224 | A * | 2/2000 | Castelli et al. | 382/232 |
| 6,026,232 | A * | 2/2000 | Yogeshwar et al. | 715/719 |
| 6,091,767 | A * | 7/2000 | Westerman | 375/240 |
| 6,104,434 | A * | 8/2000 | Nakagawa et al. | 375/240.16 |
| 6,122,318 | A * | 9/2000 | Yamaguchi et al. | 375/240 |
| 6,141,445 | A * | 10/2000 | Castelli et al. | 382/232 |
| 6,222,884 | B1 * | 4/2001 | Mitchell et al. | 375/240.18 |
| 6,351,492 | B1 * | 2/2002 | Kim | 375/240.08 |
| 6,549,670 | B1 * | 4/2003 | Sato et al. | 382/238 |
| 6,611,620 | B1 * | 8/2003 | Kobayashi et al. | 382/232 |
| 6,614,942 | B1 * | 9/2003 | Meier | 382/251 |
| 6,728,317 | B1 * | 4/2004 | Demos | 375/240.21 |
| 6,735,567 | B2 * | 5/2004 | Gao et al. | 704/258 |
| 6,909,804 | B2 | 6/2005 | Caruso et al. | 382/166 |
| 6,972,868 | B1 * | 12/2005 | Gondek et al. | 358/1.9 |
| 6,973,130 | B1 * | 12/2005 | Wee et al. | 375/240.16 |
| 7,106,910 | B2 | 9/2006 | Acharya et al. | 382/240 |
| 7,295,704 | B2 | 11/2007 | Caruso et al. | 382/166 |
| 7,333,544 | B2 * | 2/2008 | Kim et al. | 375/240.16 |
| 7,526,124 | B2 | 4/2009 | Dwyer et al. | 382/166 |
| 7,535,961 | B2 * | 5/2009 | Cho et al. | 375/240.12 |
| 7,747,096 | B2 | 6/2010 | Birinov et al. | 382/240 |
| 7,778,459 | B2 | 8/2010 | Song | 382/166 |
| 7,853,093 | B2 | 12/2010 | Birinov et al. | 382/248 |
| 7,865,027 | B2 | 1/2011 | Kim | 382/240 |
| 2001/0019630 | A1 * | 9/2001 | Johnson | 382/232 |
| 2003/0031369 | A1 * | 2/2003 | Le Pennec et al. | 382/232 |
| 2003/0035478 | A1 * | 2/2003 | Taubman | 375/240.11 |
| 2003/0108107 | A1 | 6/2003 | Kim et al. | 375/242 |
| 2003/0113026 | A1 * | 6/2003 | Srinivasan et al. | 382/239 |
| 2004/0032988 | A1 * | 2/2004 | Wu et al. | 382/239 |
| 2004/0233990 | A1 * | 11/2004 | Sekiguchi et al. | 375/240.16 |
| 2004/0236604 | A1 * | 11/2004 | McNair | 705/2 |
| 2005/0008240 | A1 | 1/2005 | Banerji et al. | 382/238 |
| 2005/0013369 | A1 * | 1/2005 | Lee | 375/240.16 |
| 2005/0141617 | A1 * | 6/2005 | Kim et al. | 375/240.21 |
| 2006/0033838 | A1 * | 2/2006 | Choi | 348/441 |
| 2006/0098879 | A1 * | 5/2006 | Kim et al. | 382/233 |
| 2006/0098881 | A1 * | 5/2006 | Kim | 382/238 |
| 2006/0098884 | A1 * | 5/2006 | Kim | 382/240 |
| 2006/0126727 | A1 * | 6/2006 | Kim et al. | 375/240.03 |
| 2006/0126962 | A1 * | 6/2006 | Sun | 382/268 |
| 2006/0139287 | A1 * | 6/2006 | Kim et al. | 345/98 |
| 2006/0146930 | A1 * | 7/2006 | Kim et al. | 375/240.03 |
| 2006/0233251 | A1 * | 10/2006 | Kim et al. | 375/240.12 |
| 2007/0014481 | A1 * | 1/2007 | Kim et al. | 382/251 |
| 2007/0025626 | A1 * | 2/2007 | Birinov et al. | 382/238 |
| 2007/0025631 | A1 * | 2/2007 | Kim et al. | 382/248 |
| 2007/0110153 | A1 * | 5/2007 | Cho et al. | 375/240.12 |
| 2007/0154087 | A1 * | 7/2007 | Cho et al. | 382/166 |
| 2007/0171490 | A1 * | 7/2007 | Cho et al. | 358/539 |

FOREIGN PATENT DOCUMENTS

| | | |
|---|---|---|
| EP | 0661886 A2 | 12/1994 |
| EP | 0661886 A3 | 12/1994 |
| EP | 0750427 A2 | 12/1996 |
| EP | 0750427 A3 * | 12/1996 |
| EP | 1 014 699 | 6/2000 |
| EP | 1014699 * | 6/2000 |
| GB | 2 371 162 | 7/2002 |
| GB | 2371162 * | 7/2002 |
| JP | 2000-078411 | 3/2000 |
| KR | 10-0178221 | 11/1998 |
| KR | 10-0202493 | 3/1999 |
| KR | 1478189 A3 | 5/2004 |

OTHER PUBLICATIONS

Google Search-"Fractal Coding Color Images Using Correlation", pp. 1-3; Google Search-"Lossless Near Lossless Image Compression, pp. 1-2; Google Search-"YCoCg-R: Color Space Reversibility, pp. 1-2.*

Hurtgen et al. Fractal Transform Coding of Color Images, pp. 1 to 9, (1683-1691).*

Zhang et al. Fractal Color Image Compression Using Vector Distortion Measure, pp. 1-4 (276-279).*

Definition of "Residue"-Merriam Webster Online and Google Search.*

Wolberg et al. "A Review of the Fractal Image Coding Literature" IEEE Transactions on Image Processing, vol. 8, No. 12, Dec. 1999, pp. 1716-1729.*

Korean Patent Application 10-0202493-Search Notes/History-1 page 1of 1; Jun. 15, 1999.*

Robinson et al. "Zerotree Pattern Coding of Motion Picture Residues for Error Resilient Transmission of Video Sequences" IEEE Journal on Selected Areasin Communications, Vo. 18, No. 6, Jun. 2000, pp. 1-12.

Shen et al. "Edge Aware Intra Prediction for Depth Map Coding" IEEE 17th ICIP Sep. 26-29, Kong Kong pp. 1-4.

Ortega et al. "3-D Video Coding Using Depth Transition Data" (2010) pp. 1-4.

Kim H, "Adaptive Rate Control Using Nonlinear Regression" IEEE Transactions on Circuits and Systems for Video Technology Vo.. 13, No. 5, May 2003 pp. 1-8.

Kim et al. "Depth Map Distortion Analysis for View Rendering and Depth Coding" IEEE (2009) ICIP pp. 1-4.

Kim et al. "A New Color Transform for RGB Coding" 2004 ICIP pp. 1-4.

Masa-Aki Kobayashi et al., "Lossless Compression for RGB Color Still Images", Proceedings of the 1999 International Conference on Image Processing (ICIP 99), Oct. 24-28, 1999, pp. 73-77, vol. 4, XP-010368688, IEEE, Piscataway, NJ, USA.

M. Kobayashi et al., "High Speed Lossless Compression Method for Color Still Images", Journal of the Institute of Image Electronics Engineers of Japan Gazo Denshi Gakkai Japan, Sep. 2002, pp. 778-786, vol. 31, No. 5, XP-008058538 (with English Summary).

Yuuki Nakane et al., "Fractal Coding of Color Images Using the Correlation Between Y and C Components", Visual Communications and Image Processing, Jul. 2003, pp. 2043-2051, vol. 5150, No. 1, XP-002363381, SPIE—The International Society for Optical Engineering, USA.

Thomas Wiegand et al., "Overview of the H.264/AVC Video Coding Standard", IEEE Transactions on Circuits and Systems for Video Technology, Jul. 2003, pp. 560-576, vol. 13, No. 7, XP-001169882.

Henrique Malvar et al., "YCoCg-R: A Color Space With RGB Reversibility and Low Dynamic Range", Joint Video Team (JVT) of ISO/IEC MPEG & ITU-T VCEG (ISO/IEC JTC1/SC29/WG11 and ITU-T SG16 Q.6, Jul. 22-24, 2003, pp. 1-5, No. JVT-1014r3, XP-002363382.

P.H.N. De With, "Motion-Adaptive Intraframe Transform Coding of Video Signals", Philips Journal of Research, Jul. 28, 1989, pp. 345-364, vol. 44, Nos. 2-3, XP-000053343.

European Search Report dated Apr. 13, 2006.

Office Action dated Mar. 5, 2009 for related U.S. Appl. No. 11/268,646.

Election dated Dec. 5, 2008 for related U.S. Appl. No. 11/268,646.

Notice of Allowance dated Dec. 11, 2009 for related U.S. Appl. No. 11/268,645.

Office Action dated Mar. 16, 2009 for related U.S. Appl. No. 11/268,645.

Restriction Requirement dated Dec. 31, 2008 for related U.S. Appl. No. 11/268,645.

Hui, "An Adaptive Truncation Coding Algorithm for Image Compression", Apr. 3, 1990, pp. 2233-2236, (XP010641631), 1990 IEEE.

Cheng et al., "Image Compression Using Adaptive Multilevel Block Truncation Coding", Sep. 1993, pp. 225-241, vol. 4, No. 3, (XP000986750), Journal of Visual Communication and Image Representation.

European Search Report issued on Feb. 16, 2006.

Thomas Wiegand, et al., "Draft Text of Final Draft International Standard (FDIS) of Joint Video Specification (ITU-T Rec. H.264/ISO/IEC 14496-10 AVC)", Text of the Joint Video Team (JVT) of ISO/IEC MPEG & ITU-T VCEG, 7th Meeting, Pattaya, Thailand, Mar. 7-14, 2003 (264pp).

E. Meyer et al. (An intrafield DCT-CODEC for consumer application) Robert Bosch GmbH, Federal Republic of Germany, pp. 553-557.

Palau et al. (Image coding with discrete cosine transforms using efficient energy-based adaptive zonal filtering) 1994, pp. 337-340.

S. Lee et al. (ASIC implementation of a new and efficient wavelet coding algorithm) Yongin 229-232.

MPEG Video Compression Standard XP-002366637, pp. 94-100, pp. 151-162, pp. 225-227.

Ramachandran et al. (A fast, FPGA-based MPEG-2 video encoder with a novel automatic quality control scheme) 25 (2002) 449-457.

Li (Computation reduction for standard-based video encoders based on the energy preservation property of DCT) 19 (2004) 457-464.

European Search Report for European Patent Application No. EP05256866 dated Jun. 23, 2006.

European Search Report for European Patent Application No. EP05256866 dated Mar. 10, 2006.

U.S. Appl. No. 11/268,646, filed Nov. 8, 2005, Wooshik Kim.

U.S. Appl. No. 11/268,645, filed Nov. 8, 2005, Wooshik Kim.

Korean Office Action for corresponding Korean Patent Application No. 10-2004-0090893 dated Apr. 24, 2006 (2 pgs).

Japanese Office Action for corresponding Japanese Patent Application No. 2004-342873 dated Jul. 20, 2010 (3 pgs).

U.S. Appl. No. 10/996,448, filed Nov. 26, 2004, Kim et al.

European Search Report dated Apr. 13, 2006 for European Patent Application No. 04257277.6.

Notice of Allowance mailed on Feb. 12, 2010 in related U.S. Appl. No. 10/996,448.

U.S. Office Action mailed on Sep. 2, 2009 in related U.S. Appl. No. 10/996,448.

U.S. Advisory Action mailed on May 20, 2009 in related U.S. Appl. No. 10/996,448.

U.S. Office Action mailed on Feb. 20, 2009 in related U.S. Appl. No. 10/996,448.

U.S. Office Action mailed on Aug. 25, 2008 in related U.S. Appl. No. 10/996,448.

U.S. Office Action mailed Oct. 6, 2010 in copending U.S. Appl. No. 10/996,448.

European Search Report European Patent Application No. EP05256865.5 dated Feb. 16, 2006.

Korean Patent Application No. 10-0202493—Search Notes/History, Jun. 15, 1999.

U.S. Office Action dated Mar. 26, 2010 issued in copending U.S. Appl. No. 11/268,645.

U.S. Notice of Allowance dated Sep. 2, 2010 issued in copending U.S. Appl. No. 11/268,645.

* cited by examiner

FIG. 11
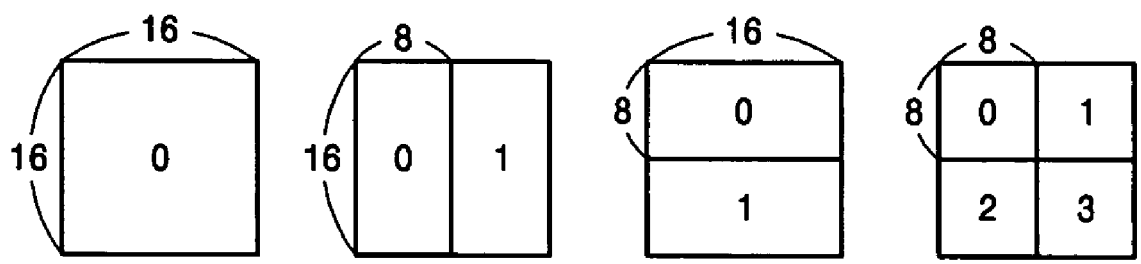
MACRO BLOCK PARTITIONS : 16x16, 16x8, 8x16, 8x8
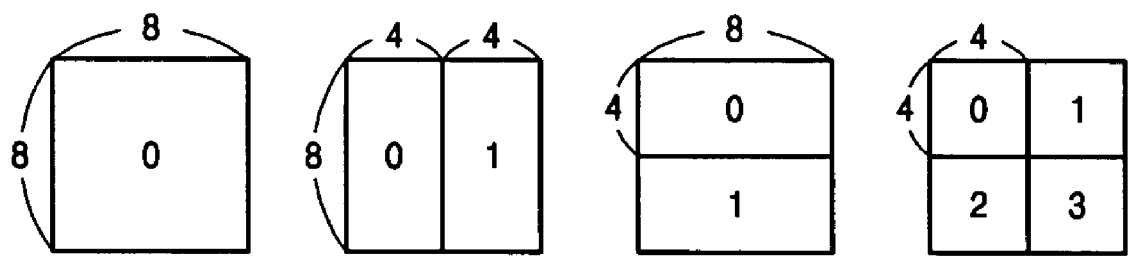
8x8 BLOCK PARTITIONS : 8x8, 8x4, 4x8, 4x4

| $P_0$ | $P_1$ | $P_2$ | $P_3$ | $P_4$ | $P_9$ | $P_{10}$ | $P_{11}$ | $P_{12}$ |
|---|---|---|---|---|---|---|---|---|
| $P_5$ | $P_a$ | $P_b$ | $P_c$ | $P_d$ | | | | |
| $P_6$ | $P_e$ | $P_f$ | $P_g$ | $P_h$ | | | | |
| $P_7$ | $P_i$ | $P_j$ | $P_k$ | $P_l$ | | | | |
| $P_8$ | $P_m$ | $P_n$ | $P_o$ | $P_q$ | | | | |

US 8,036,478 B2

COLOR IMAGE RESIDUE TRANSFORMATION AND/OR INVERSE TRANSFORMATION METHOD AND APPARATUS, AND COLOR IMAGE ENCODING AND/OR DECODING METHOD AND APPARATUS USING THE SAME

This application claims the benefit of Korean Patent Application No. 2003-84714, filed on Nov. 26, 2003, No. 2004-52322, filed on Jul. 6, 2004, and No. 2004-94554, filed on Nov. 18, 2004, in the Korean Intellectual Property Office, and the benefit of U.S. Provisional Patent Application No. 60/551,778, filed on Mar. 11, 2004, in the U.S. Patent and Trademark Office, the disclosures of which are incorporated herein in their entirety by reference.

BACKGROUND OF THE INVENTION

1. Field of the Invention

The present invention relates to image encoding and/or decoding, and more particularly, to a color image residue transform and/or inverse transform method and apparatus, and a color image encoding and/or decoding method and apparatus using the same.

2. Description of the Related Art

Generally, when a color image is encoded, color transform is first performed and then encoding is performed. There are many types of color coordinate systems, and among them, an RGB coordinate system can be picked up as a basic coordinate system. For encoding, an RGB image is transformed into a YCbCr image, a luminance component and a color component are separated, and then, encoding is performed. If thus encoding is performed, the encoding efficiency is enhanced, because there is much redundancy between respective color components and the redundancy has been removed through the transform. In particular, an integer transform method using a lifting method has been researched recently, and, for example, there is a method, YCoCg-R, developed by Microsoft.

Meanwhile, when the thus transformed image is encoded, a process removing redundancy in each component through spatiotemporal prediction is performed and as a result, a residue image is obtained. In H.264/MPEG-4 pt. 10 AVC Standardization technology of Joint Video Team (JVT) of ISO/IEC MPEG and ITU-T VCEG ("Text of ISO/IEC FDIS 14496-10: Information Technology—Coding of audio-visual objects—Part 10: Advanced Video Coding", ISO/IEC JTC 1/SC 29/WG 11, N5555, March, 2003), whose standardization has been proceeding recently, an encoding efficiency is enhanced by performing spatial and temporal prediction encoding in a variety of ways. However, when spatiotemporal prediction is performed between respective color components in an identical method, there exists much redundancy between residue images of respective color components.

SUMMARY OF THE INVENTION

The present invention provides a residue transform and/or inverse transform method and apparatus of a color image.

The present invention provides a lossless image encoding and/or decoding method and apparatus using the residue transform and/or inverse transform method and apparatus of a color image.

The present invention provides a color image encoding and/or decoding method and apparatus using the residue transform and/or inverse transform method and apparatus of a color image.

According to an aspect of the present invention, there is provided a residue transform method of a color image for residue transforming an original image formed with at least two or more components, the method including: for each component of the original image, obtaining a residue corresponding to the difference of the original image and a predicted image; and transforming the residue by using the relation between residues of color image components. The original image may have any one of an R-G-B format, a Y-Cb-Cr format, and an X-Y-Z format.

The obtaining of the residue corresponding to the difference may include: obtaining a predicted image for each component of the original image, by estimating a prediction direction from pixels spatially adjacent to the pixel block of a current frame of the color component; and obtaining a spatial residue by subtracting the predicted image from the original image. The obtaining of the residue corresponding to the difference may include: obtaining a predicted image for each component of the original image, by estimating motions in units of blocks of a predetermined size between the previous frame and a current frame of the color component; and obtaining a temporal residue by subtracting the predicted image from the original image.

In the transforming of the residue by using the relation, assuming that three components of the color image are $X_1$, $X_2$, and $X_3$, and $\Delta X_1$, $\Delta X_2$, and $\Delta X_3$ are residues of $X_1$, $X_2$, and $X_3$, respectively, the transform may be performed by using any one of the following equations 2, 4, and 7:

$$\begin{bmatrix} \Delta^2 X_1 \\ \Delta^2 X_2 \\ \Delta^2 X_3 \end{bmatrix} = \begin{bmatrix} 1 & -1 & 0 \\ 0 & 1 & 0 \\ 1 & -1 & 0 \end{bmatrix} \begin{bmatrix} \Delta X_1 \\ \Delta X_2 \\ \Delta X_3 \end{bmatrix} \quad (2)$$

$$\begin{bmatrix} \Delta^2 X_1 \\ \Delta^2 X_2 \\ \Delta^2 X_3 \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} \Delta X_1 \\ \Delta X_2 \\ \Delta X_3 \end{bmatrix} \quad (4)$$

$$\Delta^2 X_1 = \Delta X_2 - \Delta X_3 \quad (7)$$
$$t = \Delta X_3 + (\Delta^2 X_1 \gg 1)$$
$$\Delta^2 X_3 = \Delta X_1 - t$$
$$\Delta^2 X_2 = t + (\Delta^2 X_3 \gg 1)$$

where $\Delta^2 X_1$, $\Delta^2 X_2$, and $\Delta^2 X_3$ are residue transformed signals.

In the transforming of the residue by using the relation, the residue transform may be performed by selecting one of a plurality of predetermined residue transform formulas.

According to another aspect of the present invention, there is provided a residue transform apparatus of a color image for residue transforming an original image formed with at least two or more components, the apparatus including: a residue generation unit generating a residue corresponding to the difference of the original image and a predicted image; and a residue transform unit transforming the residue by using the relation between residues of color image components.

The residue generation unit may include: a spatial residue generation unit obtaining a predicted image for each component of the original image, in a case of intra mode, by estimating a prediction direction from pixels spatially adjacent to the pixel block of a current frame of the color component and obtaining a spatial residue by subtracting the predicted image from the original image; and a temporal residue generation unit obtaining a predicted image for each component of the original image, in a case of inter mode, by estimating motions in units of blocks of a predetermined size between the previous frame and a current frame of the color component and obtaining a temporal residue by subtracting the predicted image from the original image.

According to another aspect of the present invention, there is provided a residue inverse transform method of a color image, for residue inverse transforming a residue transformed image by using the correlations of residues of respective components of an original image, wherein the difference of the original image formed with at least two or more components and a predicted image is referred to as a residue, the method including: generating the residue of each component by performing residue inverse transform of the residue transformed original image; and restoring the original image by adding a predicted image to the residue of each component.

The original image may have any one of an R-G-B format, a Y-Cb-Cr format, and an X-Y-Z format.

In the restoring of the original image, in a case of intra mode, the original image may be restored by compensating the residue of each color component for a value spatially predicted by using pixels spatially adjacent to the pixel block of a current image. In the restoring of the original image, in a case of inter mode, the original image may be restored by compensating the residue of each color component for a value temporally predicted by obtaining a predicted image from the previous image.

The residual inverse transform may be performed by using any one of the following equation 9, 10, and 11:

$$\begin{bmatrix} \Delta X_1 \\ \Delta X_2 \\ \Delta X_3 \end{bmatrix} = \begin{bmatrix} 1 & 1 & 0 \\ 0 & 1 & 0 \\ 0 & 1 & 1 \end{bmatrix} \begin{bmatrix} \Delta^2 X_1 \\ \Delta^2 X_2 \\ \Delta^2 X_3 \end{bmatrix} \quad (9)$$

$$\begin{bmatrix} \Delta X_1 \\ \Delta X_2 \\ \Delta X_3 \end{bmatrix} = \begin{bmatrix} 1 & 1 & -1 \\ 1 & 0 & 1 \\ 1 & -1 & -1 \end{bmatrix} \begin{bmatrix} \Delta^2 X_1 \\ \Delta^2 X_2 \\ \Delta^2 X_3 \end{bmatrix} \quad (10)$$

$$t = \Delta^2 X_2 - (\Delta^2 X_3 >> 1)$$
$$\Delta X_1 = \Delta^2 X_3 + t$$
$$\Delta X_3 = t - (\Delta^2 X_1 >> 1)$$
$$\Delta X_2 = \Delta X_3 + \Delta^2 X_1 \quad (11)$$

where $\Delta^2 X_1$, $\Delta^2 X_2$, and $\Delta^2 X_3$ are residue transformed signals.

The residue inverse transform may be performed by decoding a residue transform formula used when the transformed residue is generated, and using an inverse transform formula corresponding to the residue transform formula.

According to an aspect of the present invention, there is provided a residue inverse transform apparatus of a color image, for residue inverse transforming a residue transformed image by using the correlations of residues of respective components of an original image, wherein the difference of the original image formed with at least two or more components and a predicted image is referred to as a residue, the apparatus including: a residue inverse transform unit generating the residue of each component by performing residue inverse transform of the residue transformed original image; and an original image restoration unit restoring the original image by adding a predicted image to the residue of each component.

The original image restoration unit may include: a spatial compensation image restoration unit restoring the original image by compensating the residue of each color component for a value spatially predicted by using pixels spatially adjacent to the pixel block of a current image in a case of intra mode; and a temporal compensation image restoration unit restoring the original image by compensating the residue of each color component for a value temporally predicted by obtaining a predicted image from the previous image in a case of intra mode.

According to an aspect of the present invention, there is provided a lossless image encoding method for encoding an original image formed with at least two or more components, the method including: for each component of the original image, obtaining a residue corresponding to the difference of the original image and a predicted image; and transforming the residue by using the relation between residues of the predetermined components and encoding the transformed residue. The original image may have any one of an R-G-B format, a Y-Cb-Cr format, and an X-Y-Z format.

The method may further include: generating a bitstream by entropy coding the residue transformed data. The encoding of the image by transforming the residue may include: selecting whether or not to perform residue transform by using the relations between residues of respective components of the color image; if residue transform is selected, transforming the residue by using the relation between residues of the predetermined components and encoding the transformed residue; and if residue transform is not selected, encoding the residue of each component of the color image.

The obtaining of a residue corresponding to the difference of the original image and a predicted image may include: obtaining a predicted image for each component of the original image, by estimating a prediction direction from pixels spatially adjacent to the pixel block of a current frame of the color component; and obtaining a spatial residue by subtracting the predicted image from the original image.

The obtaining of a residue corresponding to the difference of the original image and a predicted image may include: obtaining a predicted image for each component of the original image, by estimating motions in units of blocks of a predetermined size between the previous frame and a current frame of the color component; and obtaining a temporal residue by subtracting the predicted image from the original image. The residue transform may be performed by using the equations 2, 4, and 7.

According to another aspect of the present invention, there is provided a lossless image encoding apparatus encoding an original image formed with at least two or more components, the apparatus including: a residue generation unit generating a residue corresponding to the difference of the original image and a predicted image; and a residue transform/encoding unit transforming the residue by using the relation between residues of color image components and encoding the transformed residue. The residue transform/encoding unit may further include: an entropy coding unit entropy coding the residue transformed data and generating a bitstream.

The residue generation unit may include: a spatial residue generation unit obtaining a predicted image for each component of the original image, in a case of intra mode, by estimating a prediction direction from pixels spatially adjacent to the pixel block of a current frame of the color component and obtaining a spatial residue by subtracting the predicted image from the original image; and a temporal residue generation unit obtaining a predicted image for each component of the original image, in a case of inter mode, by estimating motions in units of blocks of a predetermined size between the previous frame and a current frame of the color component and obtaining a temporal residue by subtracting the predicted image from the original image.

According to another aspect of the present invention, there is provided a lossless decoding method using residue transform for lossless decoding an original image formed with at least two or more encoded components, the method including: when the difference of the original image and a predicted image is referred to as a residue, extracting residue transformed image data from the encoded data of the original image; generating the residue of each component by performing residue inverse transform of the residue transformed image data; and restoring the original image by adding a predicted image to the residue of each component. The original image may have any one of an R-G-B format, a Y-Cb-Cr format, and an X-Y-Z format.

In the restoring of the original image, in a case of intra mode, the original image may be restored by compensating the residue of each color component for a value spatially predicted by using pixels spatially adjacent to the pixel block of a current image. In the restoring of the original image, in a case of inter mode, the original image may be restored by compensating the residue of each color component for a value temporally predicted by obtaining a predicted image from the previous image. The residue inverse transform may be performed by using the equations 9, 10 and 11.

According to an aspect of the present invention, there is provided a lossless image decoding method using residue transform for lossless decoding an original image formed with at least two or more encoded components, the method including: determining whether or not the encoded data is residue transformed; if the data is residue transformed, generating the residue of each component of the color image by performing residue inverse transform of the residue transformed image data; if the data is not residue transformed, generating the residue of each component of the color image from the inverse quantized data; and restoring the original image by adding a predicted image to the residue of each component.

According to an aspect of the present invention, there is provided a lossless image decoding apparatus using residue transform for lossless decoding an original image formed with at least two or more encoded components, the apparatus including: a residue transform data extraction unit for extracting residue transformed image data from the encoded data of the original image, when the difference of the original image and a predicted image is referred to as a residue; a residue inverse transform unit for residue inverse transforming the residue transformed image data and generating the residue of each component; and an original image restoration unit for restoring the original image by adding a predicted image to the residue of each component.

The original image restoration unit may include: a spatial compensation unit for compensating the residue of each color component for a value spatially predicted by using pixels spatially adjacent to the pixel block of a current image in a case of intra mode; a temporal compensation unit for compensating the residue of each color component for a value temporally predicted by obtaining a predicted image from the previous image in a case of inter mode; and a lossless image restoration unit for restoring the original image by adding the predicted image compensated in the spatial compensation unit or in the temporal compensation unit, to the residue of each component of the original image. The apparatus may further include: an entropy decoding unit for entropy decoding an encoded bitstream.

According to another aspect of the present invention, there is provided a lossless image decoding apparatus using residue transform for lossless decoding an original color image formed with at least two or more encoded components, the apparatus including: a residue transform determination unit for extracting residue transform selection information indicating whether or not residue data is residue transformed, from the encoded data of the original color image, and determining whether or not the data is residue transformed; a residue transform data extraction unit for extracting residue transformed image data from the encoded data of the original color image if it is determined that the data is residue transformed; a residue inverse transform unit for performing residue inverse transform of the residue transformed image data and generating the residue of each component; a residue data extraction unit for extracting residue data of each component from the encoded data of the original color image if it is determined that the data is not residue transformed; and an original image restoration unit for restoring the original image by adding a predicted image to the residue of each component.

According to another aspect of the present invention, there is provided a color image encoding method using residue transform for encoding an original color image formed with at least two or more components, the method including obtaining, for each component of the original color image, a residue corresponding to the difference of the original color image and a predicted image generated from a restored image, transforming the residue by using a relation between the residues of the color image components, and encoding the residue transformed data, including at least quantization. The original image may have any one of an R-G-B format, a Y-Cb-Cr format, and an X-Y-Z format. The method may include entropy coding the quantized data and generating a bitstream.

Obtaining a residue corresponding to the difference may include obtaining a lossy predicted image for each component of the original image by estimating a prediction direction from pixels spatially adjacent to the pixel block of a current frame of the color component, and obtaining a lossy spatial residue by subtracting the lossy predicted image from the original image.

Obtaining a residue corresponding to the difference may include obtaining a predicted image for each component of the original image by estimating motions in units of blocks of a predetermined size between the restored previous frame and the current frame of the color component, and obtaining a lossy temporal residue by subtracting the predicted image from the original image. The predicted image in the obtaining of the residue corresponding to the difference may be generated by using an image, which is restored by performing inverse quantization and inverse transform of the signal generated through the transform and quantization in the encoding of the residue transformed data, and then performing prediction compensation. The residue transform may be performed by using the equations 2, 4, and 7.

According to an aspect of the present invention, there is provided a color image encoding method using residue transform for encoding an original color image formed with at least two or more components. The method includes obtaining, for each component of the original color image, a residue corresponding to the difference of the original color image and a predicted image generated from a restored image, selecting whether or not to perform residue transform by using a relation between the residues of the color image components; and if residue transform is selected, performing lossy encoding by transforming the residue using the relation between residues of the predetermined components; and if residue transform is not selected, lossy encoding the residue of each component of the color image.

According to an aspect of the present invention, there is provided a color image encoding apparatus using residue transform for encoding an original color image formed with at least two or more components. The apparatus includes a spatiotemporal prediction unit for generating at least one of a temporal predicted image by using the restored previous image and the current image and a spatial predicted image by using a restored current image for each component of the original color image; a residue generation unit for generating a spatial residue obtained by subtracting the spatial predicted image from the original image in a case of intra mode, and for generating a temporal residue obtained by subtracting the temporal predicted image form the original image in a case of inter mode; a residue transform unit for transforming the residue by using a relation between residues of respective components of the color image; and a residue encoding unit for encoding the transformed residue, including at least quantization. The apparatus may include an entropy coding unit for entropy coding the quantized data and generating a bitstream.

The spatiotemporal prediction unit may include a spatial prediction unit for obtaining a predicted image of each component of the original color image in a case of intra mode by estimating a prediction direction from restored pixels spatially adjacent to the pixel block of the current frame of each color component; and a temporal prediction unit for obtaining a predicted image of each component of the original color image in a case of inter mode by estimating motions between the restored previous frame and the current frame of each color component in units of blocks of a predetermined size. The predicted image of the spatiotemporal unit may be generated by using an image which is restored by performing inverse quantization and inverse transform of a signal generated through transform and quantization in the residue encoding unit, and performing prediction compensation.

According to another aspect of the present invention, there is provided a color image encoding apparatus using residue transform for encoding an original color image formed with at least two or more components. The apparatus includes a residue generation unit for generating, for each component of the original color image, a residue corresponding to the difference of the original color image and a predicted image generated from a restored color image; a residue transform selection unit for selecting whether or not to perform residue transform by using a relation between the residues of the color image components generated in the residue generation unit; a residue transform unit for transforming the residue by using the relation between residues of respective components of the color image if residue transform is selected in the residue transform selection unit; and a residue encoding unit for encoding the residue transformed in the residue transform unit, or if residue transform is not selected in the residue transform unit, for encoding the residue generated in the residue generation unit, wherein the encoding includes at least quantization.

According to an aspect of the present invention, there is provided a color image decoding method using residue transform for decoding an original color image formed with at least two or more encoded components. The method includes restoring residue transformed image data by performing lossy decoding on the encoded data of the original color image; generating the residue of each component of the color image by performing residue inverse transform of the residue transformed image data; and restoring the original color image by adding a predicted image generated by using the restored image, to the residue of each component.

The original image may have any one of an R-G-B format, a Y-Cb-Cr format, and an X-Y-Z format. In the restoring of the original color image, in a case of intra mode, the original image may be restored by compensating the residue of each color component for a value spatially predicted by using pixels spatially adjacent to the pixel block of a current image. In the restoring of the original color image, in a case of inter mode, the original image may be restored by compensating the residue of each color component for a value temporally predicted by obtaining a predicted image from the previous image.

The inverse transform may be performed by using equations 9, 10, and 11. The method may include entropy decoding an input bitstream of the original color image.

According to another aspect of the present invention, there is provided a color image decoding method using residue transform for decoding an original color image formed of at least two or more encoded components. The method includes performing at least inverse quantization of the encoded data of the original color image; determining whether or not the inverse quantized data is residue transformed; if the data is residue transformed, performing residue inverse transform of the residue transformed image data and generating the residue of each component of the color image; if the data is not residue transformed, generating the residue of each component of the color image from the inverse quantized data; and restoring the original color image by adding a predicted image to the residue of each component.

According to an aspect of the present invention, there is provided a color image decoding apparatus using residue transform for decoding an original color image formed with at least two or more encoded components. The apparatus includes a residue transform data restoration unit for restoring residue transformed image data from lossy encoded data of the original color image; a residue inverse transform unit for performing residue inverse transform of the residue transformed data and generating the residue of each component of the color image; and an original color image restoration unit for restoring the original color image by adding a predicted image generated by using a restored image, to the residue of each component.

The residue transform data restoration unit may include an entropy decoding unit for entropy decoding an encoded bitstream; and an inverse quantization/inverse transform unit for performing inverse quantization and inverse transform of the entropy decoded data.

According to an another aspect of the present invention, there is provided a color image decoding apparatus using residue transform including a lossy decoding unit for performing at least inverse quantization of a lossy encoded bitstream of a color image; a residue transform determination unit for extracting residue transform selection information indicating whether or not residue transform is performed, from the data lossy decoded in the lossy decoding unit, and interpreting the information; a residue transform data extraction unit for extracting residue transformed data from the lossy decoded data if the interpretation result of the residue transform selection information indicates that the lossy decoded data is residue transformed; a residue inverse transform unit for performing residue inverse transform of the residue transformed data and generating the residue of each component of the color image; a residue data extraction unit for extracting residue data from the lossy decoded data if the interpretation result of the residue transform selection information indicates that the lossy decoded data is not residue transformed; and an original color image restoration unit for restoring the original color image by adding a predicted image generated by using a restored image, to the residue of each component.

According to an additional aspect of the present invention, there is provided a computer readable recording medium having embodied thereon a computer program for the methods.

BRIEF DESCRIPTION OF THE DRAWINGS

The above and other features and advantages of the present invention will become more apparent by describing in detail exemplary embodiments thereof with reference to the attached drawings in which:

FIG. 11 is a diagram showing an example of a method dividing an image into blocks of a predetermined size to perform temporal prediction of an image in FIG. 6;

DETAILED DESCRIPTION OF THE INVENTION

The present invention will now be described more fully with reference to the accompanying drawings, in which exemplary embodiments of the invention are shown. First, a term to be used in the description of the present invention will be defined. A "residue" means the difference of an original color image and a predicted image. When the color image is expressed as an RGB signal, the residue value can be expressed as the following equation 1:

$$\Delta R = R - R_p$$

$$\Delta G = G - G_p$$

$$\Delta B = B - B_p \qquad (1)$$

Here, each of R, G, and B indicates the image of a corresponding component of the color image, and $R_p$, $G_p$, and $B_p$ indicate the predicted image of R, G, and B, respectively. The predicted image is used to remove redundant information inside each color component, and the signal remaining after the redundant information is removed is referred to as a residue.

Generally, when a color image is encoded, prediction encoding is performed for each color component such that redundant information in each component is removed. In this method, redundant information between color components is not considered. This is because the value of each color component is different from each other and the redundancy cannot be removed efficiently.

However, in a case of a residue signal generated after performing temporal or spatial prediction encoding in each component, a residue of each component has a value similar to each other, and therefore, the compression efficiency can be greatly improved by removing the redundant information.

Correlations between the components of color images were measured using a set of 24 images (Kodak), which is widely used. The results are shown in Table 1 and Table 2. Table 1 shows correlations between respective components of an original RGB image obtained without performing prediction encoding, and Table 2 shows correlations between residue images of respective components after performing spatial prediction encoding explained with reference to FIG. 8:

TABLE 1

|  | RG | GB | BR |
|---|---|---|---|
| Correlation | 0.85 | 0.92 | 0.75 |

TABLE 2

|  | QP | $\Delta R \Delta G$ | $\Delta G \Delta B$ | $\Delta B \Delta R$ |
|---|---|---|---|---|
| Correlation | 6 | 0.969 | 0.971 | 0.944 |
|  | 12 | 0.968 | 0.97 | 0.944 |
|  | 18 | 0.967 | 0.969 | 0.942 |
|  | 24 | 0.963 | 0.965 | 0.936 |
|  | Average | 0.967 | 0.969 | 0.942 |

As shown in tables 1 and 2, it can be seen that correlation values become higher in between residue images than in between R, G, and B of the original image. From this, it can be appreciated that higher compression efficiency can be obtained when redundancy is removed by transforming residue images of an RGB image.

Figure 1:
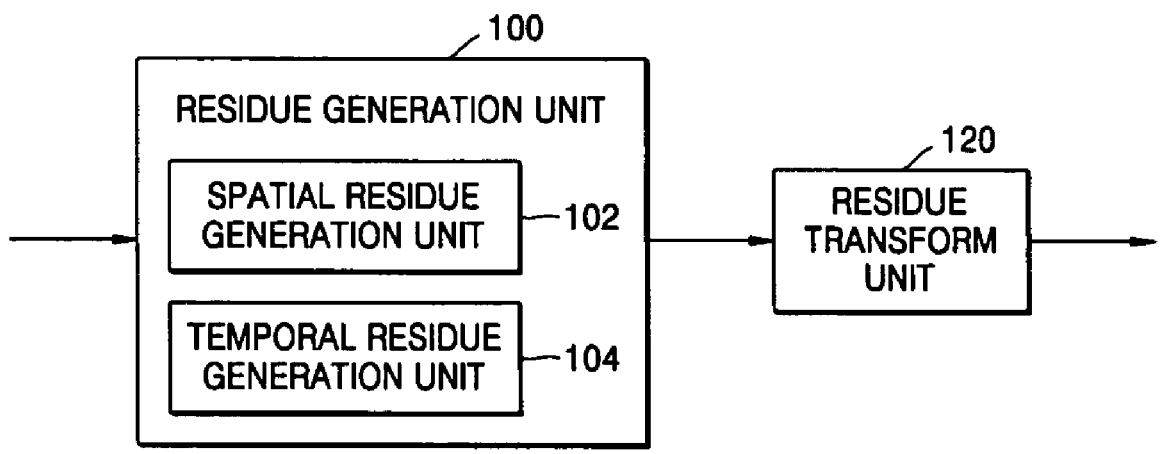
FIG. 1 is a block diagram of the structure of a residue transform apparatus according to an example of the present invention.

FIG. 1 is a block diagram of an exemplary structure of a residue transform apparatus according to the present invention, including a residue generation unit 100 and a residue transform unit 120.

The residue generation unit 100 generates a residue corresponding a difference of an original color image and a predicted image for each component of the original image, and preferably, includes at least one of a spatial residue generation unit 102 and a temporal residue generation unit 104. The original color image is formed with at least two or more components. For example, the image can be formed with red (R), green (G), and blue (B), or as an image in a Y-Cb-Cr format or an X-Y-Z format.

In a case of intra mode, for each component of the original color image, the spatial residue generation unit 102 estimates a prediction direction from pixels spatially adjacent to the pixel block of a current frame of each of the color components, obtains a predicted image, and generates a spatial residue obtained by subtracting the predicted image from the original color image. In a case of inter mode, for each component of the original color image, the temporal residue generation unit 104 estimates motions between the previous frame and a current frame of each color component in units of blocks of a predetermined size, obtains a predicted image, and generates a temporal residue obtained by subtracting the predicted image from the original image.

When lossless encoding is performed, the predicted image is generated by performing spatial or temporal prediction using a current image and the previous image, and when lossy encoding is performed, the predicted image is generated by performing spatial or temporal prediction using a current image, a restored current image, and a restored previous image.

The residue transform unit 120 transforms the residue by using the relations between residues of the respective color image components. The residue transform can be performed by a variety of transform formulas. Also, the residue transform can be performed adaptively by selecting one of a plurality of predetermined residue formulas and performing residue transform using the selected formula.

For example, in the residue transform, assuming that three components of a color image are $X_1$, $X_2$, and $X_3$, and $\Delta X_1$, $\Delta X_2$, and $\Delta X_3$ are residues of $X_1$, $X_2$, and $X_3$, respectively, residue transform can be performed by subtracting the residue value of one component from the residue values of the other two components of the three components as in the following equation 2:

$$\begin{bmatrix} \Delta^2 X_1 \\ \Delta^2 X_2 \\ \Delta^2 X_3 \end{bmatrix} = \begin{bmatrix} 1 & -1 & 0 \\ 0 & 1 & 0 \\ 1 & -1 & 0 \end{bmatrix} \begin{bmatrix} \Delta X_1 \\ \Delta X_2 \\ \Delta X_3 \end{bmatrix} \quad (2)$$

Here, $\Delta^2 X_1$, $\Delta^2 X_2$, and $\Delta^2 X_3$ are residue transformed signals.

An applied example of the equation 2 will now be explained. When a color image is expressed by an RGB signal, a transform method subtracting $\Delta G$ from $\Delta R$ and $\Delta B$ with using $\Delta G$ as a predictor can be expressed as the following equation 3:

$$\begin{bmatrix} \Delta^2 R \\ \Delta^2 G \\ \Delta^2 B \end{bmatrix} = \begin{bmatrix} 1 & -1 & 0 \\ 0 & 1 & 0 \\ 1 & -1 & 0 \end{bmatrix} \begin{bmatrix} \Delta R \\ \Delta G \\ \Delta B \end{bmatrix} \quad (3)$$

Here, $\Delta^2 R$, $\Delta^2 G$, and $\Delta^2 B$ are residue transformed signals.

Also, as the residue transform formula, the following equation 4 can also be used:

$$\begin{bmatrix} \Delta^2 X_1 \\ \Delta^2 X_2 \\ \Delta^2 X_3 \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} \Delta X_1 \\ \Delta X_2 \\ \Delta X_3 \end{bmatrix} \quad (4)$$

Here, $\Delta^2 X_1$, $\Delta^2 X_2$, and $\Delta^2 X_3$ are residue transformed signals.

The equation 4 shows a color transform formula set up considering correlations between respective components in order to more efficiently remove redundancy between respective components. That is, an applied example of the equation 4 is a YCoCg transform formula expressed as the following equations 5 and 6:

$$\begin{bmatrix} Y \\ Co \\ Cg \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} R \\ G \\ B \end{bmatrix} \quad (5)$$

The following equation 6 is obtained by applying the YCoCg transform formula of the equation 5 to residue transform:

$$\begin{bmatrix} \Delta^2 R \\ \Delta^2 G \\ \Delta^2 B \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} \Delta R \\ \Delta G \\ \Delta B \end{bmatrix} \quad (6)$$

However, in a case of YCoCg transform formula, a rounding error occurs during transform. Accordingly, in order to perform lossless transform, each of the components corresponding to Co and Cg, respectively, among $\Delta R$, $\Delta G$, and $\Delta B$ components, should be multiplied by 4 and then used.

In addition, as the residue transform formula, the following equation 7 can also be used.

$$\Delta^2 X_1 = \Delta X_2 - \Delta X_3$$

$$t = \Delta X_3 + (\Delta^2 X_1 >> 1)$$

$$\Delta^2 X_3 = \Delta X_1 - t$$

$$\Delta^2 X_2 = t + (\Delta^2 X_3 >> 1) \quad (7)$$

The equation 7 is obtained by generalizing YCoCg-R. YCoCg-R is obtained by improving YCoCg transform by using a lifting method, and is expressed as the following equation 8:

$$Co = R - B$$

$$t = B + (Co >> 1)$$

$$Cg = G - t$$

$$Y = t + (Cg >> 1) \quad (8)$$

This transform can also be applied to a residue transform formula in the same manner. In this case, when transform is performed, each of the components corresponding to Co and Cg, respectively, among ΔR, ΔG, and ΔB components, is multiplied by 2 such that lossless transform is enabled without a rounding error.

Figure 2:
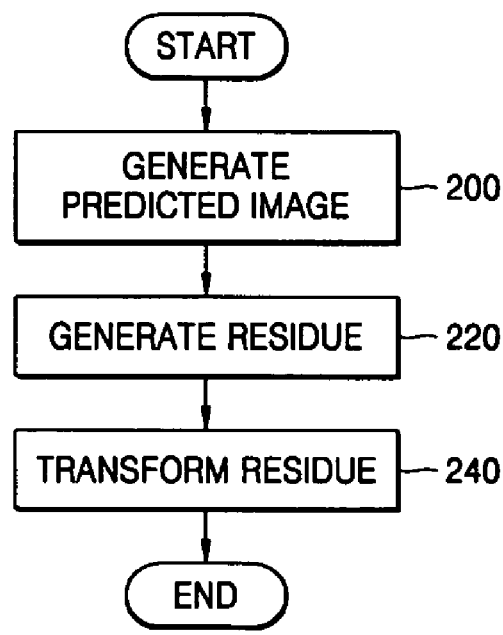
FIG. 2 is a flowchart of the operations performed by a residue transform method of a color image according to an example of the present invention.

FIG. 2 is a flowchart of the operations performed by an exemplary residue transform method of a color image according to the present invention. Referring to FIGS. 1 and 2, the operation of the residue transform apparatus of a color image according to an example of the present invention will now be explained.

First, in order to obtain the residue of a color image, a predicted image is obtained in operation 200. In a case of intra mode, the predicted image is obtained for each component of an original color image, by estimating a prediction direction from pixels spatially adjacent to the pixel block of a current block. In a case of inter mode, the predicted image is obtained for each component of the original color image, by estimating motions in units of blocks of a predetermined size between the previous frame and a current frame.

Then, the residue of each component of the original color image is obtained in the residue generation unit 100 in operation 220. The residue is obtained by the difference of the original color image and the predicted image. More specifically, for the residue generation, a spatial residue is obtained in the spatial residue generation unit 102 by the difference of the original color image and a spatial predicted image, and a temporal residue is obtained in the temporal residue generation unit 104 by the difference of the original color image and a temporal predicted image. If the residue is obtained, the residue is transformed in the residue transform unit 120 by using a relation between residues of the respective color image components in operation 240. For the residue transform, as described above, for example, in a case of an RGB image, encoding can be performed by subtracting the residue value of the G component from the residue values of the R and B components. Also, residue transform can be performed using other transform formulas, such as YCoCg transform formula or YCoCg-R transform formula.

Figure 3:
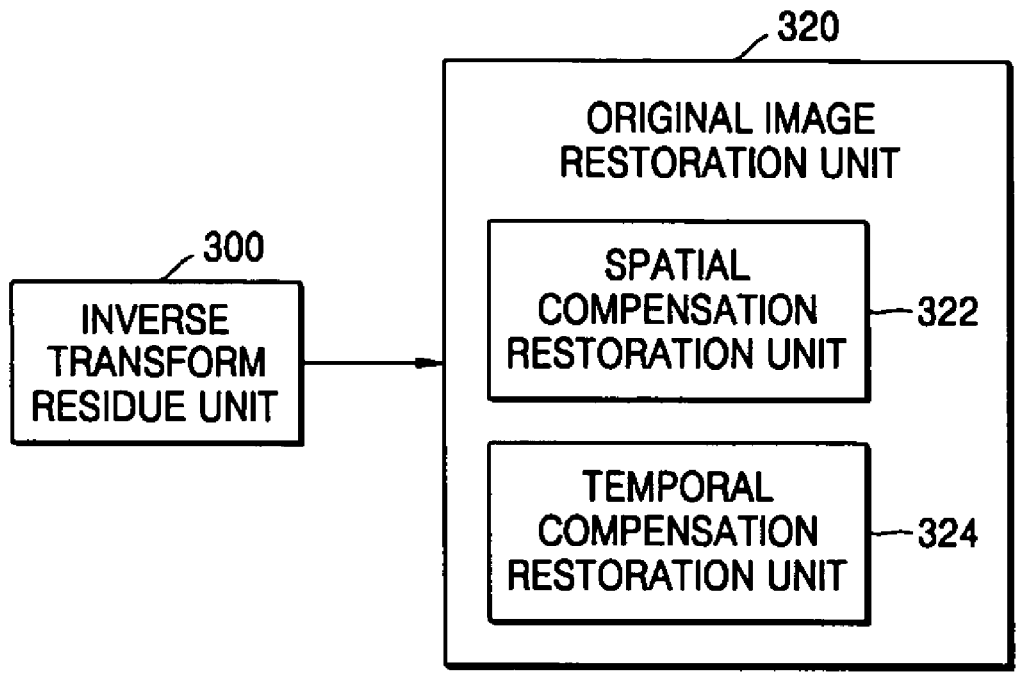
FIG. 3 is a block diagram of the structure of a residue inverse transform apparatus of a color image according to an example of the present invention.

FIG. 3 is a block diagram of the structure of an exemplary residue inverse transform apparatus of a color image according to the present invention, including a residue inverse transform unit 300 and an original image restoration unit 320.

The residue inverse transform unit 300, when an original color image is formed with at least two or more components, generates the residue for each component by performing residue inverse transform for the residue transformed original color image. The original image restoration unit 320 restores the original color image by adding a predicted image to the residue of each component, and may include at least one of a spatial compensation image restoration unit 322 and a temporal compensation image restoration unit 324.

In a case of intra mode, the spatial compensation image restoration unit 322 restores the original image by compensating the residue of each of the color components for a spatially predicted value, by using pixels spatially adjacent to the pixel block of a current image. In a case of inter mode, the temporal compensation image restoration unit 324 restores the original image by compensating the residue of each of the color components for a temporally predicted value, by obtaining a predicted image from the previous image.

Figure 4:
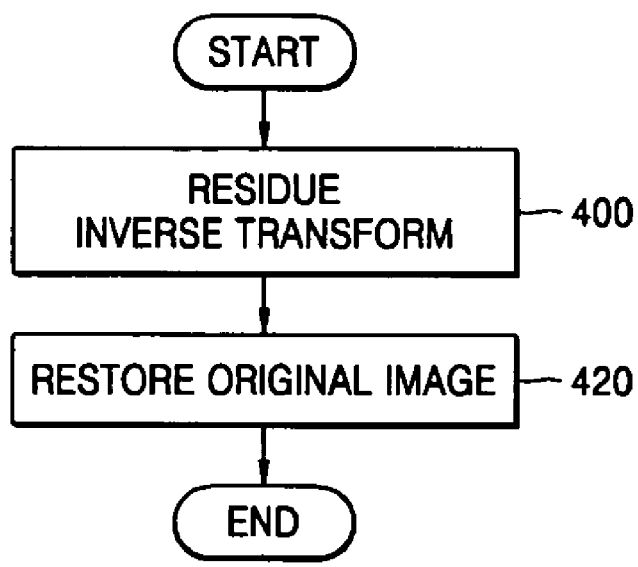
FIG. 4 is a flowchart of the operations performed by a residue inverse transform method of a color image according to an example of the present invention.

FIG. 4 is a flowchart of the operations performed by a residue inverse transform method of a color image according to an example of the present invention. Referring to FIGS. 3 and 4, the operation of the exemplary residue inverse transform apparatus of a color image according to the present invention will now be explained.

First, by performing residue inverse transform for the residue transformed original color image, the residue of each of the components is generated in operation 400. The original color image may have a format of any one of an R-G-B format, a Y-Cb-Cr format, and an X-Y-Z format, for example.

The residue inverse transform is the inverse process of the residue transform and uses the inverse transform formula of the residue transform formula, which is used when the residue is transformed. For instance, residue inverse transform an be performed using equation 9 as the inverse transform formula if the transform formula equation 2 is used for residue transform, equation 10 as the inverse transform formula if the transform formula equation 4 is used, and equation 11 as the inverse transform formula if the transform formula equation 7 is used.

$$\begin{bmatrix} \Delta X_1 \\ \Delta X_2 \\ \Delta X_3 \end{bmatrix} = \begin{bmatrix} 1 & 1 & 0 \\ 0 & 1 & 0 \\ 0 & 1 & 1 \end{bmatrix} \begin{bmatrix} \Delta^2 X_1 \\ \Delta^2 X_2 \\ \Delta^2 X_3 \end{bmatrix} \quad (9)$$

Here, $\Delta^2 X_1$, $\Delta^2 X_2$, and $\Delta^2 X_3$ are residue transformed signals.

$$\begin{bmatrix} \Delta X_1 \\ \Delta X_2 \\ \Delta X_3 \end{bmatrix} = \begin{bmatrix} 1 & 1 & -1 \\ 1 & 0 & 1 \\ 1 & -1 & -1 \end{bmatrix} \begin{bmatrix} \Delta^2 X_1 \\ \Delta^2 X_2 \\ \Delta^2 X_3 \end{bmatrix} \quad (10)$$

Here, $\Delta^2 X_1$, $\Delta^2 X_2$, and $\Delta^2 X_3$ are residue transformed signals.

$t = \Delta^2 X_2 - (\Delta^2 X_3 >> 1)$ $\Delta X_1 = \Delta^2 X_3 + t$ $\Delta X_3 = t - (\Delta^2 X_1 >> 1)$ $\Delta X_2 = \Delta X_3 + \Delta^2 X_1$ \hfill (11)

Here, $\Delta^2 X_1$, $\Delta^2 X_2$, and $\Delta^2 X_3$ are residue transformed signals.

If the residue inverse transform is performed, the original image is restored by adding the predicted image to the residue of each of the components in operation 420. If an intra mode encoding is used, the original image is restored by compensating the residue of each of the color components for a spatially predicted value by using pixels spatially adjacent to the pixel block of a current image. If an inter mode encoding is used, the original image is restored by compensating the residue of each of the color components for a temporally predicted value by obtaining a predicted image from the previous image.

When selecting and using a predetermined transform formula among a plurality of residue transform formula, the residue inverse transform can be performed by decoding the residue transform formula information and using an inverse formula corresponding to the decoded information.

Next, a lossless image encoding method and apparatus using residue transform according to the present invention will now be explained. Basically, the lossless image encoding method and apparatus using residue transform perform image encoding by using the residue transform method and apparatus of a color image according to the present invention described above.

Figure 5:
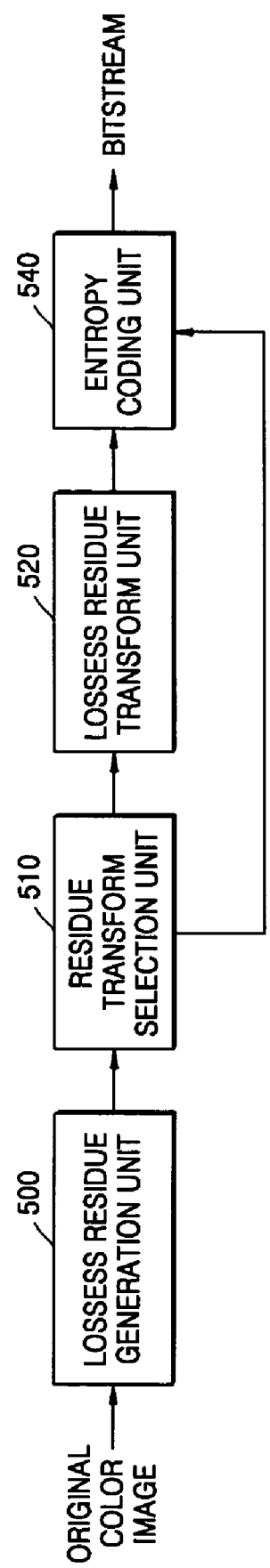
FIG. 5 is a block diagram of the structure of a preferred embodiment of a lossless image encoding apparatus using residue transform according to an example of the present invention.

FIG. 5 is a block diagram of the structure of an exemplary lossless image encoding apparatus using residue transform according to the present invention. As shown in FIG. 5, the apparatus includes a lossless residue generation unit 500 and a lossless residue transform unit 520. The apparatus may further include an entropy coding unit 540. To provide an adaptive function, the apparatus may further include a residue transform selection unit 510.

Figure 6:
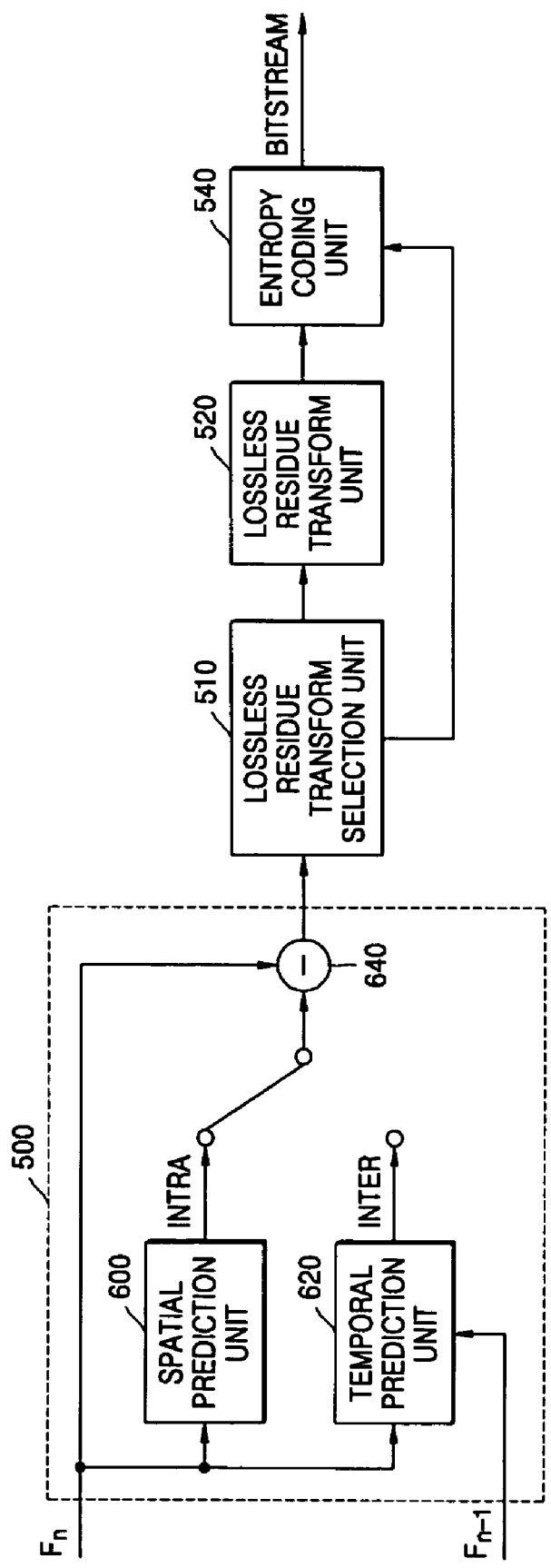
FIG. 6 is a block diagram of the structure of an exemplary lossless image encoding apparatus according to the present invention illustrating a more detailed structure of a lossless residue generation unit.

FIG. 6 is a block diagram of the structure of an exemplary lossless image encoding apparatus according to the present invention illustrating a more detailed structure of the lossless residue generation unit 500. The lossless residue generation unit 500 generates a residue for each component of the original color image, and includes a spatial prediction unit 600, a temporal prediction unit 620, and a lossless residue calculation unit 640. The spatial prediction unit 600 obtains a predicted image of each component of the original color image by estimating a prediction direction from pixels spatially adjacent to the pixel block of a current frame $F_n$ of each color component. The temporal prediction unit 620 obtains a predicted image of each component of the original image, by estimating motions in units of blocks of a predetermined size between the previous frame $F_{n-1}$ and a current frame $F_n$ of each color component. The lossless residue calculation unit 640 generates a spatial residue obtained by subtracting the spatial predicted image from the original image in a case of intra mode, and generates a temporal residue obtained by subtracting the temporal predicted image from the original image in a case of inter mode.

The lossless residue transform unit 520 performs encoding by transforming the residue based on the relations between residues of the predetermined components. In a case of an RGB image, the lossless residue transform unit 520 can perform encoding by subtracting the residue value of the G component from the residue values of the R and B components. Residue transform also can be performed by using other transforms, such as YCoCg transform formula or YCoCg-R transform formula.

The entropy coding unit 540 generates a bitstream by entropy coding the output value of the lossless residue transform unit 520. Here, the original color image can have any one of an R-G-B format, a Y-Cb-Cr format, and an X-Y-Z format.

The residue transform selection unit 510 enables to determine whether a residue generated in the lossless residue generation unit 500 is residue transformed and then either encoded or is encoded without residue transform.

Figure 7:
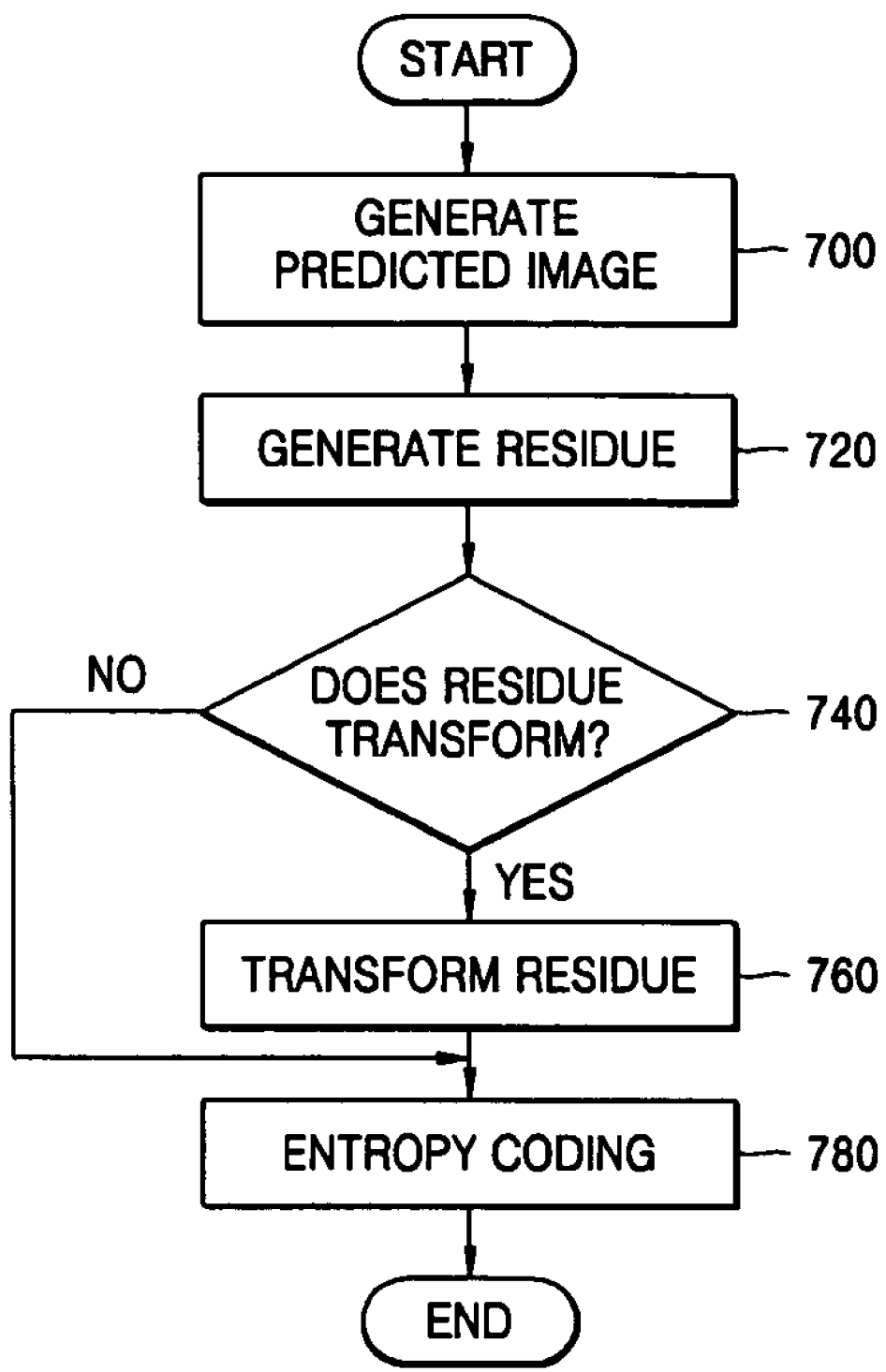
FIG. 7 is a flowchart of the operations performed by a lossless image encoding method using residue transform according to an example of the present invention.

FIG. 7 is a flowchart of the operations performed by a lossless image encoding method using residue transform according to the present invention; Referring to FIG. 7, the operation of the lossless image encoding apparatus using residue transform according to the present invention will now be explained.

In the present embodiment, an RGB image will be used as color input image $F_n$ of the encoding apparatus in FIG. 6. The image is processed in units of blocks of a predetermined size in the encoding apparatus. In order to enhance the encoding efficiency, the encoding apparatus performs prediction by using intra mode using the spatial prediction unit 620 performing prediction from a spatially adjacent block, and inter mode using the temporal prediction unit 620 performing prediction by estimating a motion from the previous frame image $F_{n-1}$. When prediction encoding is performed spatially or temporally, each color component is predicted only from the image of the identical color component. As the result, a residue value is obtained. The residue value is obtained for each color component.

Then, if the residue transform is selected in the residue transform selection unit 510, residue transform is performed through the residue transform unit 520 in order to use the correlation of the three components. The residue transformed information is compressed through the entropy coding unit 540 and a bitstream is generated.

Referring to FIG. 7, first, as in the conventional encoding apparatus, for each color component, a predicted image is obtained by the lossless residue generation unit 500 in operation 700, and by obtaining the difference of the original color image and the predicted image, a residue is generated in operation 720.

More specifically, this is achieved by obtaining a spatial residue and a temporal residue. In order to obtain the spatial residue, in a case of intra mode, the spatial prediction unit 600 obtains a predicted image for each component of the original image, by estimating a prediction direction from pixels spatially adjacent to the pixel block of a current frame of the color component, and the predicted image is subtracted from the original image by the residue generation unit 640 such that the spatial residue is obtained. In order to obtain the temporal residue, in a case of inter mode, the temporal prediction unit 620 obtains a predicted image for each component of the original image, by estimating motions in units of blocks of a predetermined size between the previous frame and a current frame, and the predicted image is subtracted from the original image by the lossless residue calculation unit 640 such that the temporal residue is obtained.

Then, if residue transform is selected by the residue transform selection unit 510 in operation 740, in order to remove redundant information between residues of respective color components, residue transform is performed by the lossless residue transform unit 520 in operation 760. When residue transform is performed, a loss should not occur. For example, as a simple method, there is a method performing transform by subtracting $\Delta G$ from $\Delta R$ and $\Delta B$ with using $\Delta G$ as a predictor. This method is expressed as the equation 3.

Also, in order to more efficiently remove redundancy between respective components, a color transform formula set up considering correlation between respective color components can be applied. Equation 5 is YCoCg transform formula. Also, equation 8 is a case where YCoCg transform formula of equation 5 is applied to residue transform. However, since when transform is performed using YCoCg transform formula, a rounding error occurs, in order to perform lossless transform, each of the components corresponding to Co and Cg, respectively, among $\Delta R$, $\Delta G$, and $\Delta B$ components, should be multiplied by 4 and then used. YCoCg-R is obtained by improving YCoCg transform by using a lifting method, and the transform formula is as equation 8. This transform formula can also be applied to residue transform formula in the same manner. In this case, when transform is performed, each of the components corresponding to Co and Cg, respectively, among $\Delta R$, $\Delta G$, and $\Delta B$ components, is multiplied by 2 such that lossless transform is enabled without a rounding error. The residue transformed data is entropy coded by the entropy coding unit 540 and generated as a bitstream in operation 780. Meanwhile, if residue transform is not selected by the residue transform selection unit 510 in operation 740, the generated residue is directly entropy coded in operation 780.

Figure 8:
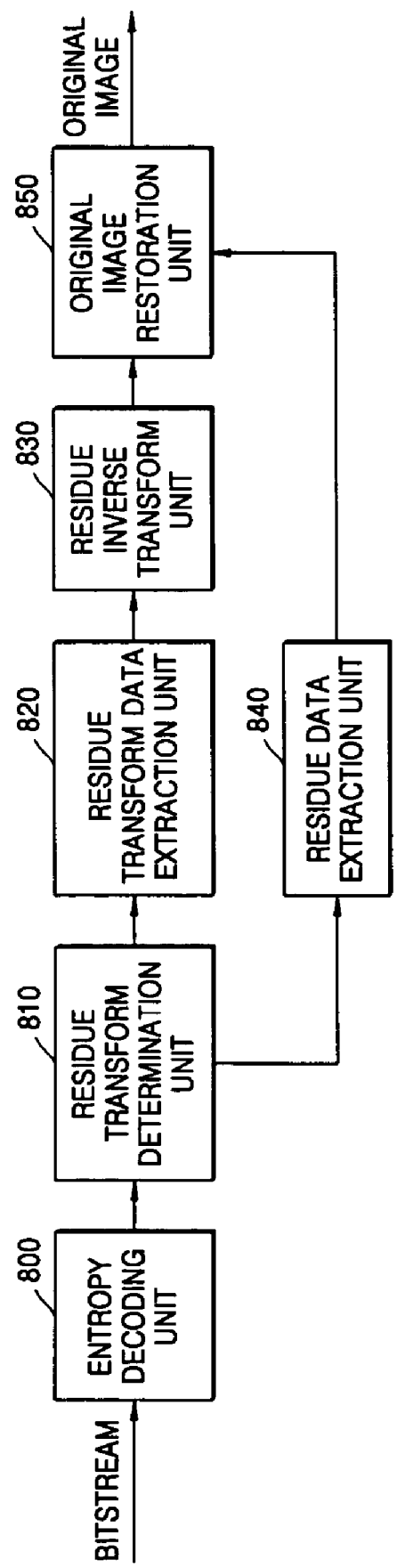
FIG. 8 is a block diagram of the structure of an exemplary lossless image decoding apparatus using residue transform between color planes in the present invention.

FIG. 8 is a block diagram of the structure of a lossless image decoding apparatus using residue transform between color planes in the present invention, and the apparatus includes a residue transform data extraction unit 820, a residue inverse transform unit 830, and an original image restoration unit 850. If an input bitstream is a bitstream that is entropy coded when encoded, it is preferable that the apparatus further includes an entropy decoding unit 800. Also, if an adaptive function is provided such that the bitstream has residue transform selection information, it is preferable that the apparatus further includes a residue transform determination unit 810 and a residue data extraction unit 840.

The residue transform data extraction unit 820 extracts residue transform image data from the encoded data of the original color image. The residue inverse transform unit 830 performs residue inverse transform of the residue transformed image data, and generates the residue of each component.

The original image restoration unit 850 restores the original image by adding a predicted image to the residues of respective components.

Figure 9:
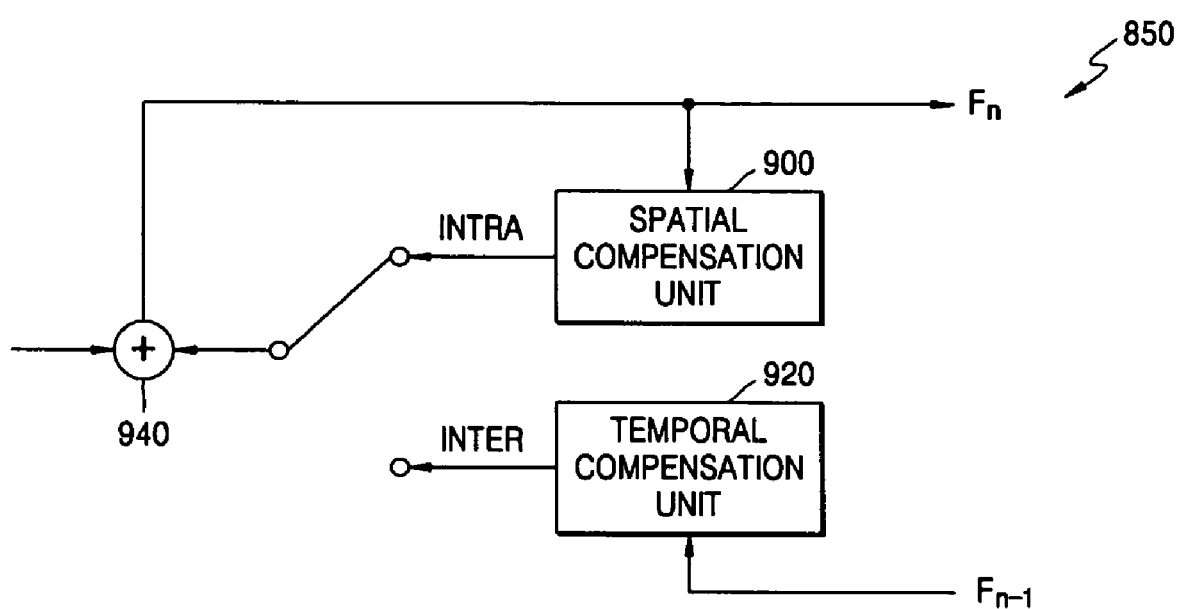
FIG. 9 is a detailed block diagram of an exemplary original image restoration unit.

FIG. 9 is a detailed block diagram of the original image restoration unit 850, which includes a spatial compensation unit 920, a temporal compensation unit 940, and a lossless image restoration unit 960.

The spatial compensation unit 920 compensates the residue of each color component for a value spatially predicted by using pixels spatially adjacent to the pixel block of a current image. The temporal compensation unit 940 compensates the residue of each color component for a value temporally predicted by obtaining a predicted image from the previous image. The lossless image restoration unit 960 restores the original image by adding the predicted image compensated in the spatial compensation unit 900 or the temporal compensation unit 920, to the residue of each component of the original image inverse transformed in the residue inverse transform unit 830, or to the residue of each component extracted in the residue data extraction unit 840.

The residue transform determination unit 810 extracts residue transform selection information indicating whether or not entropy decoded data is residue transformed, and determines whether or not residue is transformed. If according to the result of decoding the residue transform selection information it is determined that the residue is not transformed, the residue data extraction unit 840 extracts residue data from the bitstream. The entropy decoding unit 800 entropy decodes the input bitstream.

Figure 10:
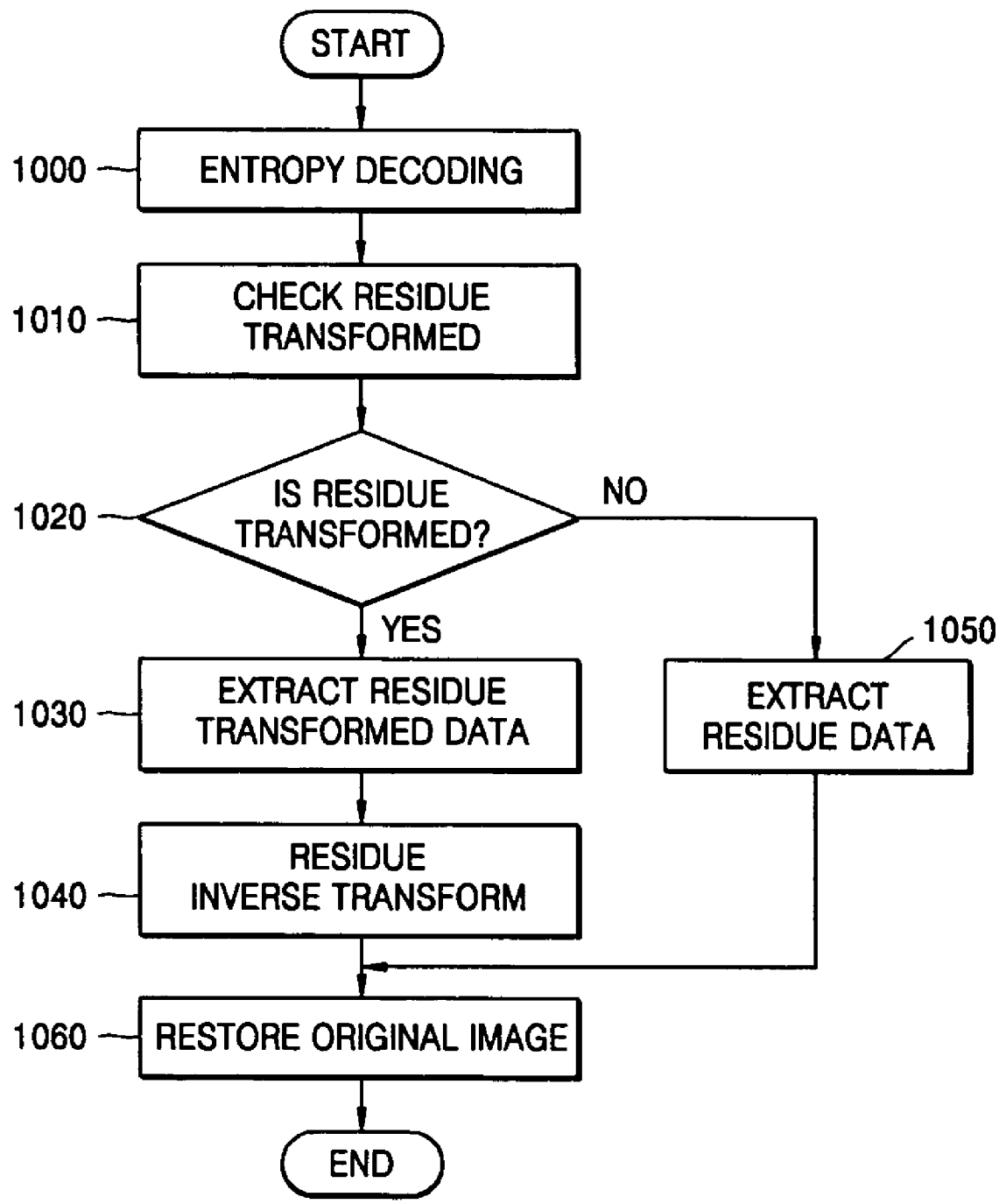
FIG. 10 is a flowchart of the operations performed by an exemplary embodiment of a lossless image decoding method using residue transform according to the present invention.

FIG. 10 is a flowchart of the operations performed by a preferred embodiment of a lossless image decoding method using residue transform according to the present invention. Referring to FIGS. 8 and 10, the operation of the lossless image decoding apparatus using residue transform will now be explained.

First, an input bitstream is entropy decoded in operation 1000. In order to know from the entropy decoded data whether or not residue transform is performed when the data is encoded, residue transform selection information is decoded in operation 1010. If it is determined that residue transform is performed in operation 1020, residue transformed image data is extracted from the encoded data of the original color image in operation 1030.

Then, residue inverse transform of the residue transformed image data is performed such that the residue of each component is generated in operation 1040. The residue inverse transform is the inverse process of the residue transform described above, and uses the inverse transform formula of the residue transform formula that is used when the residue is transformed. Accordingly, residue inverse transform is performed by using equation 9 as the inverse transform formula if the transform formula equation 2 is used for residue transform, equation 10 as the inverse transform formula if the transform formula equation 4 is used, and equation 11 as the inverse transform formula if the transform formula equation 7 is used.

If it is determined that residue transform is not performed in operation 1020, residue data is extracted from the encoded data of the original color image in operation 1050. Then, by adding a predicted image to the residue data of each component, the original image is restored in operation 1060.

More specifically, in intra mode, the spatial compensation unit 900 obtains a predicted value by a spatial prediction method, as a block value spatially adjacent to current image $F_n$, and in inter mode, the temporal compensation unit 920 obtains a predicted value by a temporal prediction method as previous image $F_{n-1}$. Then, a residue value is added to the predicted value in the lossless image restoration unit 940 such that restored image Fn is obtained in operation 1060.

FIG. 11 is a diagram showing an example of a method dividing an image into blocks of a predetermined size to perform temporal prediction of an image in FIG. 6. This method is used by ISO/IEC 14496-10 and ITU-T Rec. H.264 standard technologies. In this method, basically, a macro block with a size of 16×16 pixels is divided into a variety of sizes, including 16×16, 16×8, 8×16, and 8×8, and by obtaining the motion vector of each divided part, an image value is temporally predicted. In particular, an 8×8 block is again divided into an 8×8, 8×4, 4×8, or 4×4 size such that even a fine motion can also be accurately detected.

Figures 12A, 12B:
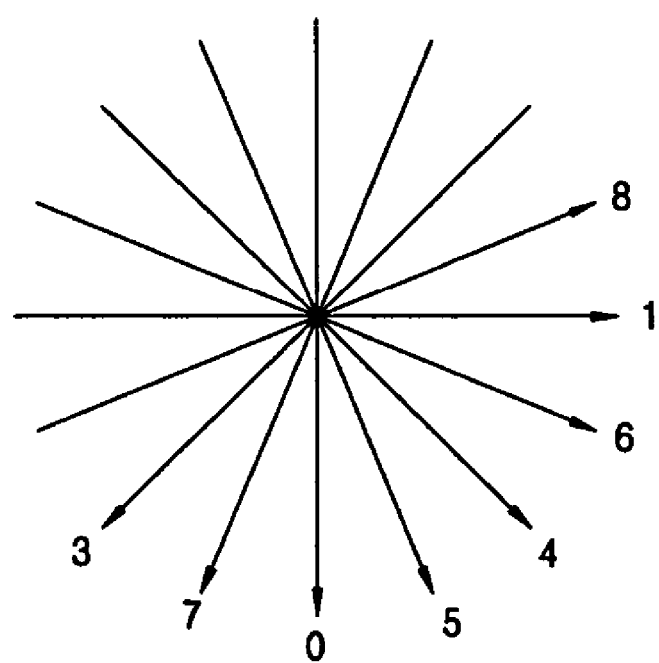
FIG. 12A is a diagram showing examples of locations of adjacent pixels for spatial prediction and locations of pixels of a current block to be predicted in FIG. 6.
FIG. 12B shows 9 examples of prediction directions from directions 0 through 8 for projection from spatially adjacent pixels to predict a current block in FIG. 6.

FIG. 12A is a diagram showing locations of adjacent pixels for spatial prediction and locations of pixels of a current block to be predicted in FIG. 6. This method is used in ISO/IEC 14496-10 and ITU-T Rec. H.264 standard technologies. In FIG. 12(A), in order to predict 4×4 block data (pa, pb, . . . , pq), spatially adjacent data (P0, P1, . . . , P12) previously encoded and restored are used. FIG. 12B shows 9 prediction directions from 0 to 8 for projection from spatially adjacent pixels to predict a current block. For example, in the case of direction 0, by projecting adjacent pixel values, P1, P2, P3, and P4 in the vertical direction, pa, pe, pi, and pm are predicted from P1 value; pb, pf, pj, and pn from P2 value; pc, pg, pk, and po from P3 value; and pd, ph, pl, and pq from P4 value. For other directions, prediction is performed through projection in the same manner.

For this temporal/spatial prediction method, the conventional standard technology is explained as an example, and other methods can also be used.

Meanwhile, in order to use a lossless encoding and decoding method and apparatus in the conventional lossy encoding and decoding method and apparatus, a signal indicating lossless encoding is needed to be encoded. This signal is encoded as header information and can be inserted into the head of an upper level, such as a sequence, a picture, and a slice, to be encoded. Also, it can be indicated, by using a quantization parameter (QP) value indicating the degree of quantization. For example, predetermined cases, such as a case when a QP value indicates a minimum value, are set and in such cases, without performing transform and quantization, lossless encoding is performed.

Figure 13:
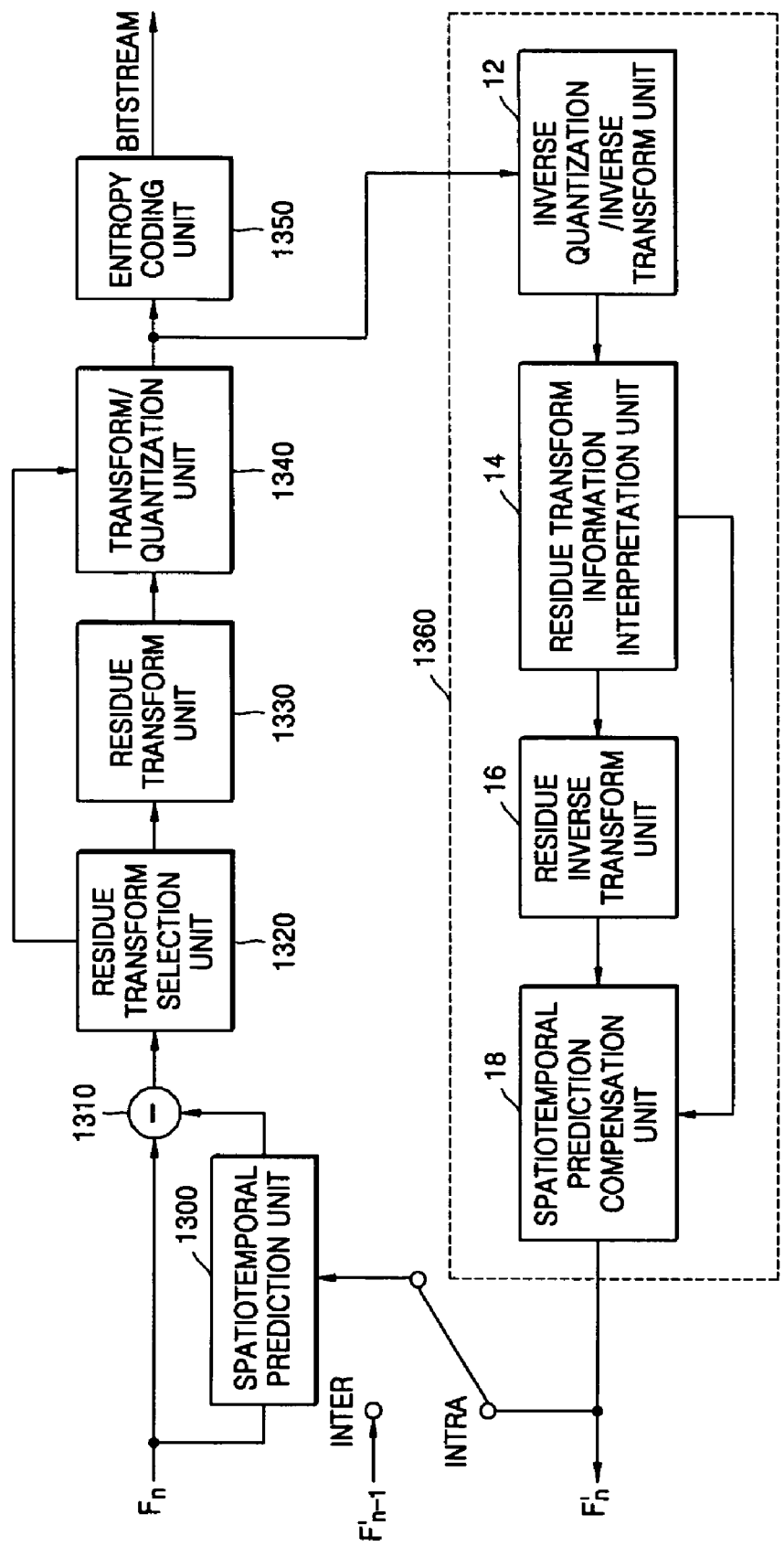
FIG. 13 is a color image encoding apparatus according to an exemplary embodiment of the present invention.

FIG. 13 is a color image encoding apparatus according to a preferred embodiment of the present invention. The apparatus includes a spatiotemporal prediction unit 1300, a residue generation unit 1310, a residue transform unit 1320, a transform/quantization unit 1340, an entropy coding unit 1350, and an image restoration unit 1360.

The spatiotemporal unit 1300 generates at least one of a temporal predicted image and a spatial predicted image, and has a spatial prediction unit and a temporal prediction unit.

In a case of intra mode, for each component of the original color image, the spatial prediction unit estimates a prediction direction from restored pixels spatially adjacent to the pixel block of a current frame of each of the color components, and obtains a predicted image. In a case of inter mode, for each component of the original color image, the temporal prediction unit estimates motions between the restored previous frame and the current frame of each color component in units of blocks of a predetermined size, and obtains a predicted image.

The residue generation unit 1310 generates a spatial residue obtained by subtracting the spatial predicted image from the original image in a case of intra mode, and generates a temporal residue obtained by subtracting the temporal predicted image from the original image in a case of inter mode.

The residue transform selection unit 1320 enables to select whether a residue generated in the residue generation unit 1310 is residue transformed and then encoded or is encoded without residue transform. The residue transform selection unit 1320 is an option and if this is not used, a residue generated in the residue generation unit 1310 is residue transformed by the residue transform unit 1330.

The residue transform unit 1330 transforms the residue and encoded it by using the relations between residues of the predetermined components. For the residue transform of the residue transform unit 1330, in the case of an RGB image as in the equation 2, encoding can be performed by subtracting the residue value of the G component from the residue values of the R and B components. Also, as in equations 4 and 7, residue transform can be performed by using YCoCg transform formula or YCoCg-R transform formula.

The transform/quantization unit 1340 performs transform and quantization such as DCT transform, of the data residue transformed in the residue transform unit 1330, or the residue data generated in the residue generation unit 1310.

The entropy coding unit 1350 entropy codes the output value of the transform/quantization unit 1340 and generates a bitstream. Here, the original color image can have any one of an R-G-B format, a Y-Cb-Cr format, and an X-Y-Z format.

The image restoration unit 1360 generates a restored current image for lossy encoding, and includes an inverse quantization/inverse transform unit 12, a residue transform information interpretation unit 14, a residue inverse transform unit 16, and a spatiotemporal prediction compensation unit 18.

The inverse quantization/inverse transform unit 12 performs inverse quantization and inverse transform of data transformed and quantized in the transform/quantization unit 1340. The residue transform information interpretation unit 14 interprets whether the inverse quantized and inverse transformed data is residue transformed. The residue inverse transform unit 18, if the residue transform information interpretation unit 14 interprets that the data is residue transformed, performs residue inverse transform through the inverse process of the transform of the residue transform unit 1330. The spatiotemporal compensation unit 18 performs spatiotemporal prediction compensation for the residue inverse transformed data or residue data, such that a restored current image is generated.

Figure 14:
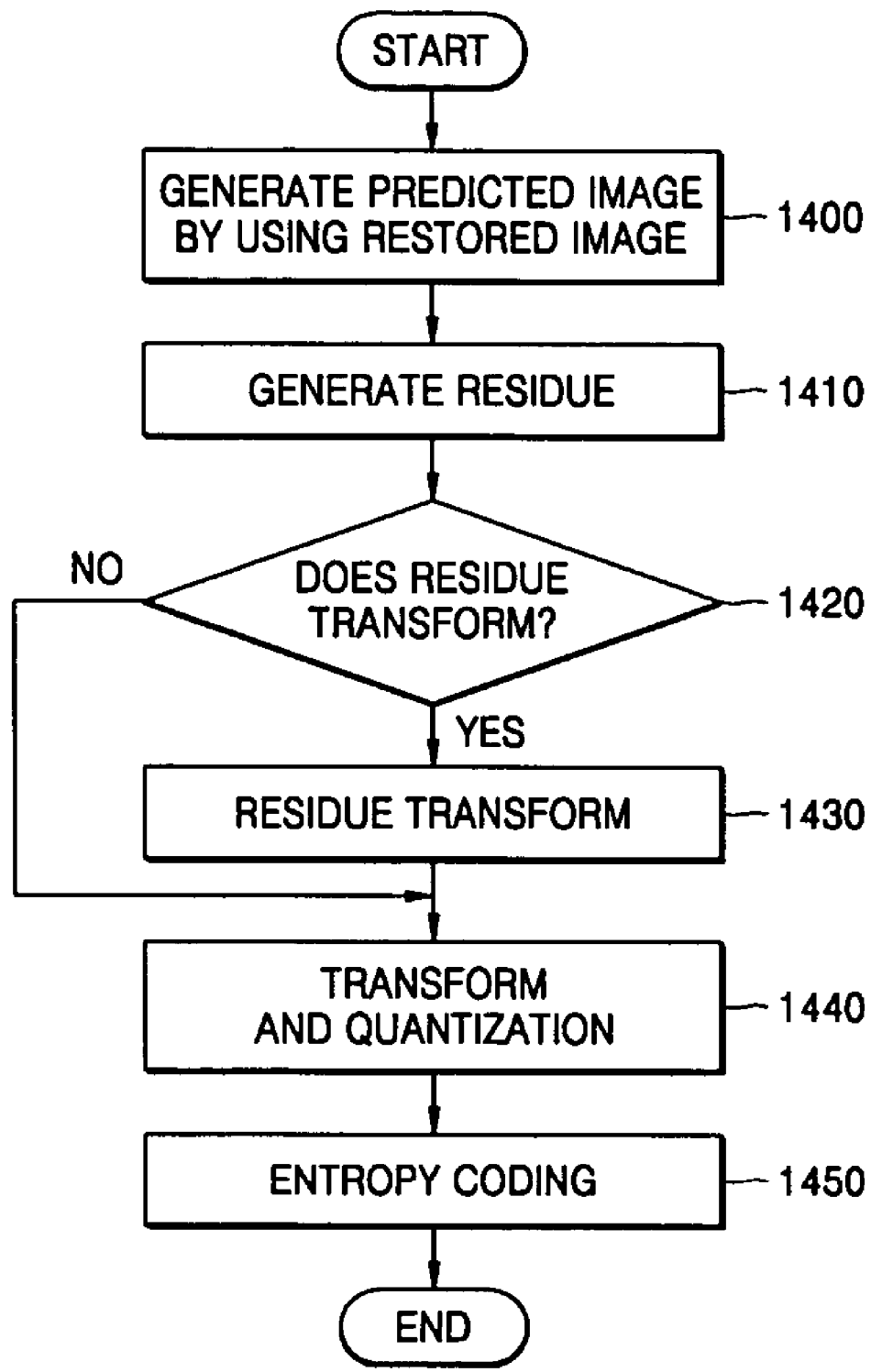
FIG. 14 is a flowchart of the operations performed by a color image encoding method using residue transform according to an exemplary embodiment of the present invention.

FIG. 14 is a flowchart of the operations performed by a color image encoding method using residue transform according to a preferred embodiment of the present invention. Referring to FIGS. 13 and 14, the operation of a color image encoding apparatus using residue transform according to the present invention will now be explained.

Input image $F_n$ 101 of the encoding apparatus is processed in units of a predetermined size in the encoding apparatus. When each block of a unit size is encoded, as in the conventional encoding apparatus, a predicted image for each color component is obtained by the spatiotemporal prediction unit 1300 in operation 1400.

The predicted image is obtained by using a current image restored in the image restoration unit 1360 through inverse quantization and inverse transform, residue inverse transform and spatiotemporal prediction compensation of the value transformed and quantized in the transform/quantization unit 1340. If the predicted image is obtained, the difference of the original color image and the predicted image is obtained such that a residue is generated in operation 1410.

More specifically, this is achieved by obtaining a spatial residue and a temporal residue. In order to obtain the spatial residue, in a case of intra mode, the spatial prediction unit obtains a spatial predicted image for each component of the original image, by estimating a prediction direction from restored pixels spatially adjacent to the pixel block of a current frame of the color component. Then, the spatial predicted image is subtracted from the original image by the residue generation unit 1310 such that the spatial residue is generated.

In order to obtain the temporal residue, in a case of inter mode, the temporal prediction unit obtains a predicted image for each component of the original image, by estimating motions in units of blocks of a predetermined size between the restored previous frame and the current frame of the color component. Then, the temporal predicted image is subtracted from the original image by the residue generation unit 1310 such that the temporal residue is generated.

Then, if residue transform is selected by the residue transform selection unit 1320 in operation 1420, in order to remove redundant information between residues of respective color components, residue transform is performed by the residue transform unit 1330 in operation 1430.

When residue transform is performed, a loss should not occur. For example, as a simple method, there is a method performing transform by subtracting $\Delta G$ from $\Delta R$ and $\Delta B$ with using $\Delta G$ as a predictor. This method is expressed as the equation 3.

Also, in order to more efficiently remove redundancy between respective components, a color transform formula set up considering correlation between respective color components can be applied. Equation 5 is YCoCg transform formula. Also, equation 8 is a case where YCoCg transform formula of equation 5 is applied to residue transform. YCoCg-R is obtained by improving YCoCg transform by using a lifting method, and the transform formula is as equation 8. This transform formula can also be applied to residue transform formula in the same manner.

The residue transformed data is transformed and quantized in units of blocks of a predetermined size by the transform/quantization unit 1340 and by doing so, lossy compression is performed in operation 1440.

Then, the data is entropy coded by the entropy coding unit 540 and generated as a bitstream in operation 1450.

Meanwhile, if residue transform is not selected by the residue transform selection unit 1320 in operation 1420, the residue generated in the residue generation unit 1310 is transformed and quantized in operation 1440, and entropy coded in operation 1450.

Figure 15:
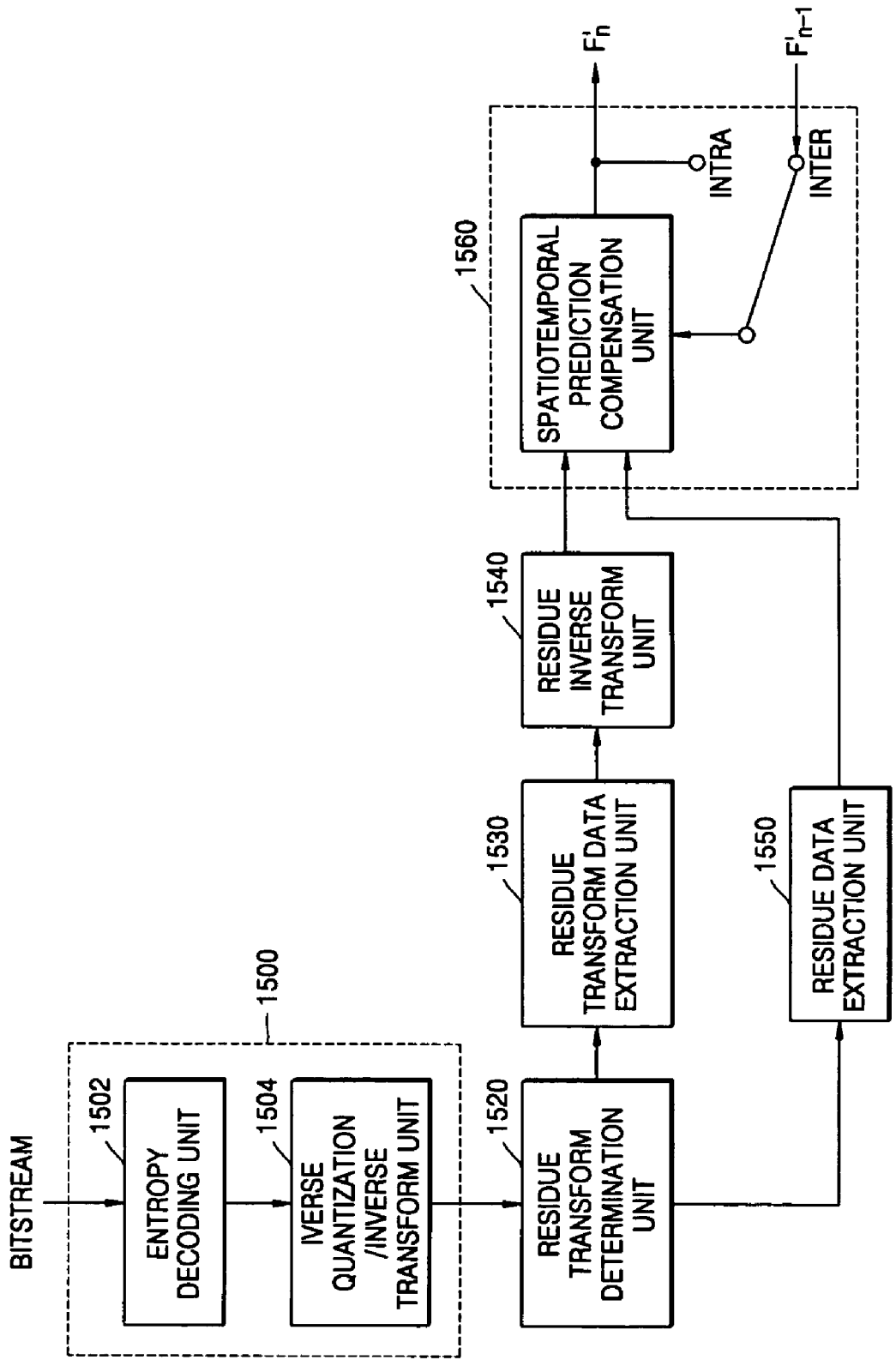
FIG. 15 is a block diagram of the structure of a color image decoding apparatus using residue transform according to an exemplary embodiment of the present invention.

FIG. 15 is a block diagram of the structure of a color image decoding apparatus using residue transform according to a preferred embodiment of the present invention. The color image decoding apparatus includes a lossy decoding unit 1500, a residue transform determination unit 1520, a residue transform data extraction unit 1530, a residue inverse transform unit 1540, a residue extraction unit 1550, and a color image restoration unit 1560.

The lossy decoding unit 1500 performs lossy decoding, by performing at least inverse quantization of a lossy encoded bitstream of a color image, and includes an entropy decoding unit 1502 and an inverse quantization/inverse transform unit 1504. The entropy decoding unit 1502 entropy decodes an encoded bitstream into transform coefficients. The inverse quantization/inverse transform unit 1504 performs inverse quantization and inverse transform of the entropy decoded data.

The residue transform determination unit 1520 interprets whether residue transform is performed, by extracting residue transform selection information indicating whether or not residue transform is performed, from the inverse quantized data of the original color image. The residue transform determination unit 1520 is an unnecessary block if when the original color image is encoded, residue transform is not an option but a must, and in this case, inverse quantized and inverse transformed data is directly residue inverse transformed.

The residue transform data extraction unit 1530, if the interpretation result of the residue transform selection information indicates that the data lossy decoded in the inverse quantization/inverse transform unit 1504 is residue transformed, extracts residue transform data from the inverse quantized and inverse transformed data.

The residue inverse transform unit 1540 performs residue inverse transform of the residue transformed data such that the residue of each component of the color image is generated.

The residue data extraction unit 1550, if the interpretation result of the residue transform selection information indicates that the data lossy decoded in the inverse quantization/inverse transform unit 1504 is not residue transformed, extracts residue data from the inverse quantized and inverse transformed data.

The original color image restoration unit 1560 restores the original color image by adding a predicted image generated by using a restored image, to the residue of each component.

Figure 16:
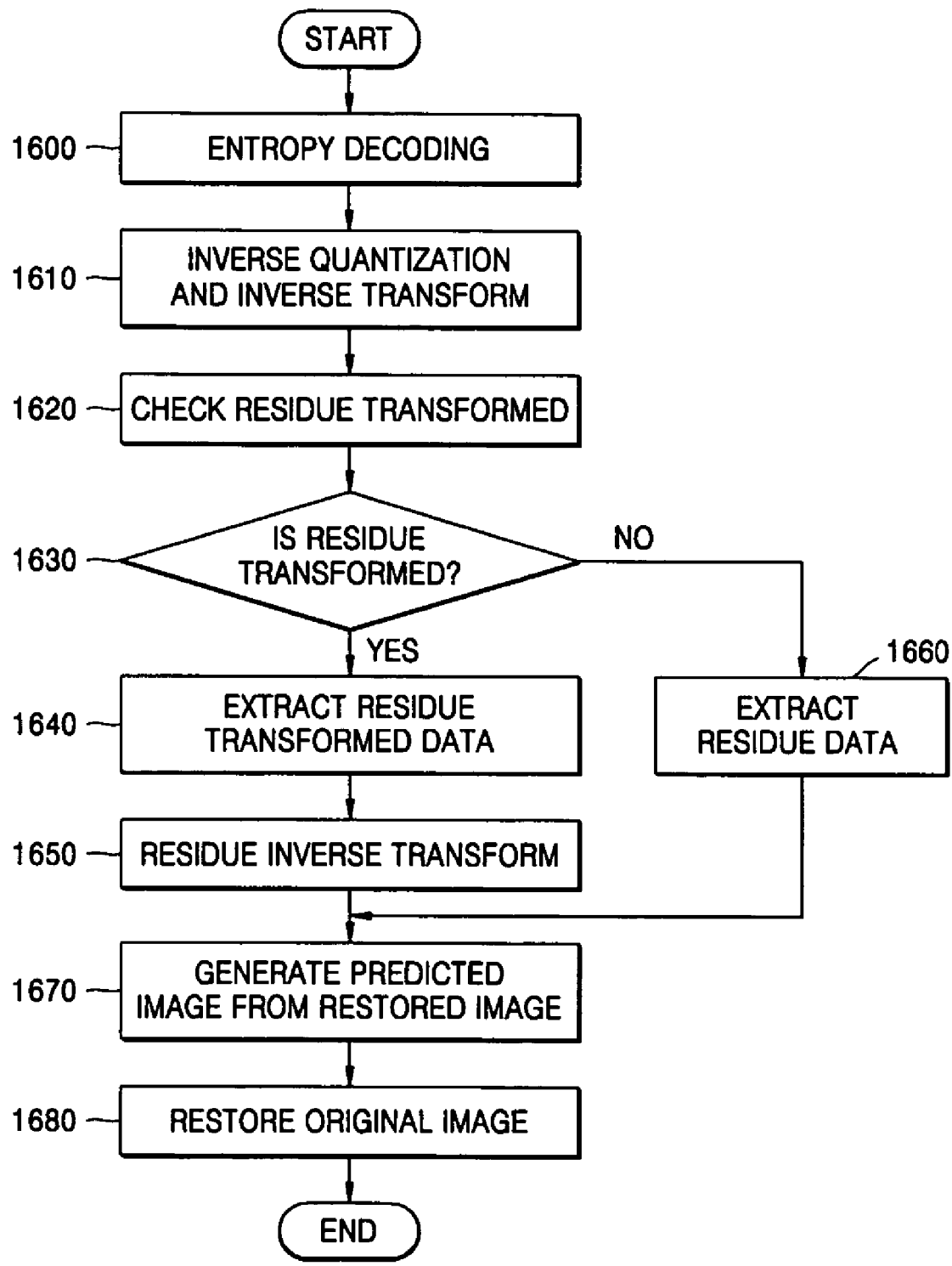
FIG. 16 is a flowchart of the operations of an exemplary embodiment of a color image decoding method using residue transform according to the present invention.

FIG. 16 is a flowchart of the operations of a preferred embodiment of a color image decoding method using residue transform according to the present invention. Referring to FIGS. 15 and 16, the operation of the color image decoding apparatus using residue transform according to the present invention will now be explained.

First, a compressed bitstream is decoded into transform coefficients through the entropy decoding unit 1502 in operation 1600, and these values are inverse quantized and inverse transformed in the inverse quantization/inverse transform unit 1504 to be restored in operation 1610. From the restored data, residue selection information is extracted in the residue transform determination unit 1520 such that whether or not residue is transformed is checked in operation 1620. If it is determined that the data is residue transformed, residue transform data is extracted from the inverse quantized and inverse transformed data in the residue transform data extraction unit 1530 in operation 1640 and residue inverse transform is performed such that the residue of each component is restored in operation 1650. The residue inverse transform is the inverse process of the residue transform described above, and uses the inverse transform formula of the residue transform formula that is used when the residue is transformed. Accordingly, residue inverse transform is performed by using equation 9 as the inverse transform formula if the transform formula equation 2 is used for residue transform, equation 10 as the inverse transform formula if the transform formula equation 4 is used, and equation 11 as the inverse transform formula if the transform formula equation 7 is used.

If it is determined that the data is not residue transformed, residue data is restored from the inverse quantized and inverse transformed data in the residue data extraction unit 1550 in operation 1660.

If a predicted image is generated from the restored image in operation 1670, the predicted image is added to the restored residue through spatiotemporal prediction compensation in the color image restoration unit 1560 such that the original color image is restored in operation 1680.

FIGS. 11, 12A, and 12B are diagrams explaining the prediction method in inter mode and intra mode when prediction encoding is performed in the image encoding and/or decoding method and apparatus using residue transform according to the present invention. Explanations of FIGS. 11, 12A and 12B are the same as in the lossless image encoding and/or decoding method and apparatus and therefore will be omitted.

Figure 17:
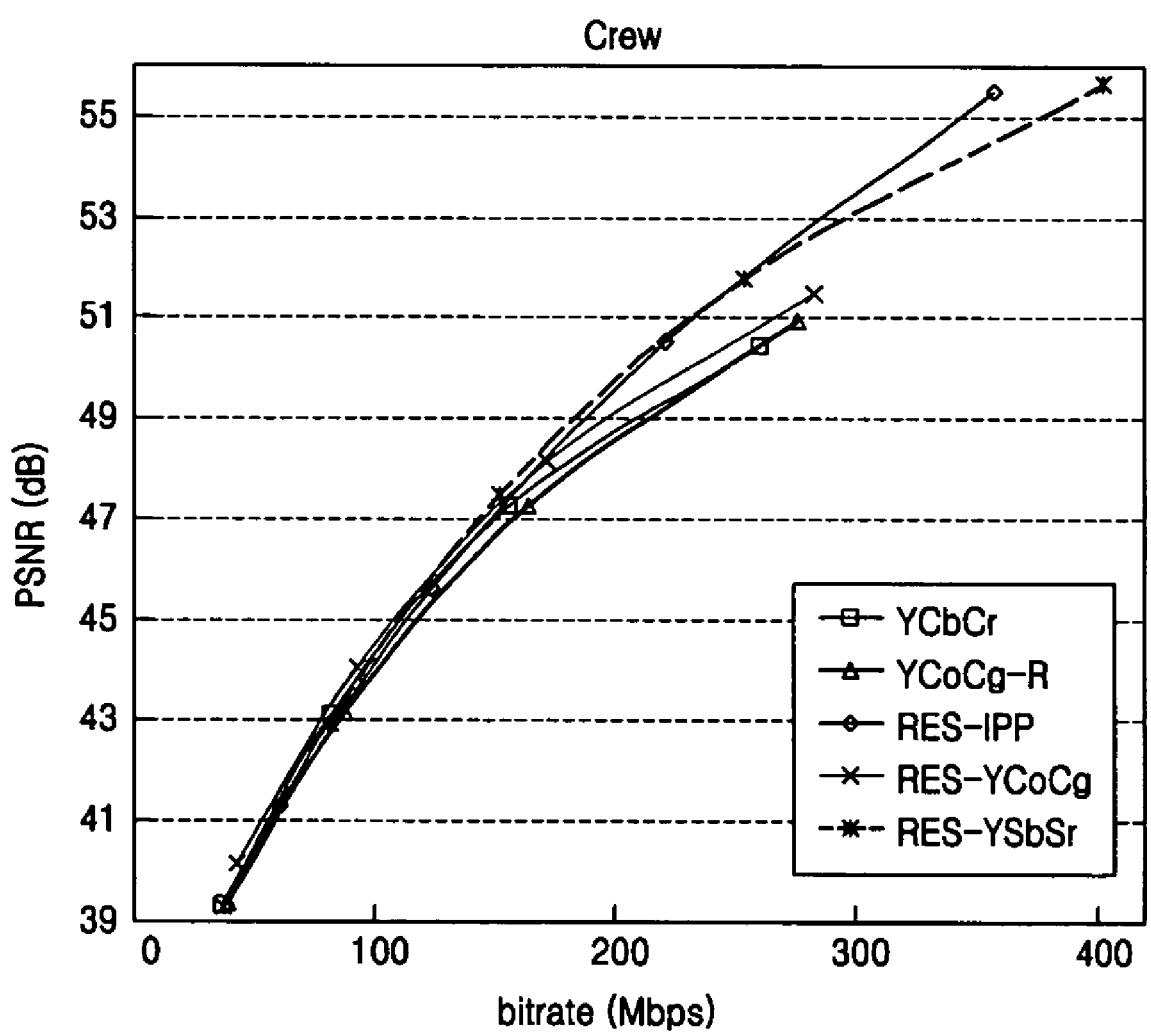
FIG. 17 is a graph comparing the compression efficiency of the color image encoding method using residue transform according to the present invention with that of the conventional method through experiments at a variety of bitrates.

FIG. 17 is a graph comparing the compression efficiency of the color image encoding method using residue transform according to the present invention with that of the conventional method through experiments at a variety of bitrates. As the experiment image, "Crew" image that is a HD level image used for tests in the international standardization bodies, such as MPEG and JVT, was used.

For encoding, the spatial prediction encoding explained with reference to FIGS. 12(A) and 12(B) was used. In the figure, YCbCr and YCoCg-R indicate conventional methods.

First, the transform formula and inverse transform formula for YCbCr are as the following equation 12. These formulas comply with SMPTE 274M method.

$$\begin{bmatrix} Y \\ Cb \\ Cr \end{bmatrix} = \begin{bmatrix} 0.2126 & 0.7152 & 0.0722 \\ -0.1146 & -0.3854 & 0.5 \\ 0.5 & -0.4542 & -0.0458 \end{bmatrix} \begin{bmatrix} R \\ G \\ B \end{bmatrix} \quad (12)$$

$$\begin{bmatrix} R \\ G \\ B \end{bmatrix} = \begin{bmatrix} 1.0 & 0.0 & 1.5748 \\ 1.0 & -0.1873 & -0.4681 \\ 1.0 & 1.8556 & 0.0 \end{bmatrix} \begin{bmatrix} Y \\ Cb \\ Cr \end{bmatrix}$$

Meanwhile, YCoCg transform and inverse transform formulas developed by Microsoft are as the following equation 13:

$$\begin{bmatrix} Y \\ Co \\ Cg \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} R \\ G \\ B \end{bmatrix} \quad (13)$$

$$\begin{bmatrix} R \\ G \\ B \end{bmatrix} = \begin{bmatrix} 1 & 1 & -1 \\ 1 & 0 & 1 \\ 1 & -1 & -1 \end{bmatrix} \begin{bmatrix} Y \\ Co \\ Cg \end{bmatrix}$$

YCoCg-R is obtained by improving YCoCg transform by using a lift method and this transform and inverse transform formulas are as the following equation 14:

$$\begin{aligned} C0 &= R - B & t &= Y - (Cg \gg 1) \\ t &= B + (Co \gg 1) &\Leftrightarrow\quad G &= Cg + t \\ Cg &= G - t & B &= t - (Co \gg 1) \\ Y &= t + (Cg \gg 1) & R &= B + Co \end{aligned} \quad (14)$$

In FIG. 17, what are expressed with "RES-" are those using residue transform. First, in "RES-IPP", the transform and inverse transform formulas used are as the following equation 15:

$$\begin{bmatrix} \Delta^2 R \\ \Delta^2 G \\ \Delta^2 B \end{bmatrix} = \begin{bmatrix} 1 & -10 \\ 0 & 10 \\ 1 & -10 \end{bmatrix} \begin{bmatrix} \Delta R \\ \Delta G \\ \Delta B \end{bmatrix} \quad (15)$$

$$\begin{bmatrix} \Delta R \\ \Delta G \\ \Delta B \end{bmatrix} = \begin{bmatrix} 1 & 10 \\ 0 & 10 \\ 0 & 11 \end{bmatrix} \begin{bmatrix} \Delta^2 R \\ \Delta^2 G \\ \Delta^2 B \end{bmatrix}$$

Here, R, G, and B indicate residue images of respective components. In this method, G is encoded and then by using this value, R and B are predicted and then encoded.

Meanwhile, "RES-YCoCg" indicates residue images transformed by using YCoCg transform and "RES-YSbSr" indicates residue images transformed by using YSbSr transform that is a kind of color transform.

Thus, residue transform can be used by applying a variety color transform formulas. Accordingly, with respect to characteristics of an image, according to the correlation between residues of respective color components, or with respect to bitrates, an appropriate transform formula can be applied and used. When correlation of respective components is small, by applying identity transform, encoding can also be performed without residue transform. In order to apply an appropriate transform formula adaptively with respect to an image or an environment, an index is given to predetermined transform formulas, and the index of a used transform formula is encoded and then, when data is decoded, the transform formula of the corresponding index can be used. Also, by encoding transform coefficients into a bitstream, a transform formula desired by a user can also be used. This adaptive method can be applied by setting a predetermined unit, such as a slice unit, or a macro block unit.

As shown in the result of the experiment, when residue transform was performed, it can be seen that the compression efficiency increases more than that of the conventional method.

The present invention can also be embodied as computer readable codes on a computer readable recording medium. The computer readable recording medium is any data storage device that can store data that can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

According to the present invention as described above, instead of redundancy between respective components before encoding, the redundancy between residues of respective color components, after generating the residue image of each color component through spatiotemporal prediction during the encoding process, is removed such that when a color image is encoded, a higher compression efficiency can be achieved.

What is claimed is:

1. A color image encoding method using residue transform for encoding an original color image formed with at least two or more components, the method comprising:
    obtaining, for each component of the original color image, a residue corresponding to the difference of the original color image and a predicted image generated from a restored image;
    selecting whether or not to transform the residue by using a relation between residues of respective components of the original color image; and
    transforming the residue and encoding the transformed residue if the transforming of the residue is selected, or if the transforming of the residue is not selected, encoding the obtained residue, wherein the encoding of the obtained residue includes at least quantization.

2. The method of claim 1, wherein the original image has any one of an R-G-B format, a Y-Cb-Cr format, and an X-Y-Z format.

3. The method of claim 2, wherein the obtaining of the residue corresponding to the difference comprises:
    obtaining a predicted image for each component of the original image, by estimating motions in units of blocks of a predetermined size between the restored previous frame and the current frame of the color component; and
    obtaining a lossy temporal residue by subtracting the predicted image from the original image.

4. The method of claim 2, wherein the obtaining of the residue corresponding to the difference comprises:
    in a case of intra mode, obtaining a lossy predicted image for each component of the original image, by estimating a prediction direction from pixels spatially adjacent to the pixel block of a current frame of the color component and obtaining a spatial residue by subtracting the lossy predicted image from the original image; and
    in a case of inter mode, obtaining a lossy predicted image for each component of the original image, by estimating motions in units of blocks of a predetermined size between the restored previous frame and the current frame of the color component and obtaining a temporal residue by subtracting the predicted image from the original image.

5. The method of claim 2, wherein the predicted image in the obtaining of the residue corresponding to the difference is generated by using an image which is restored by performing inverse quantization and inverse transform of the signal generated through the transform and quantization in the encoding of the residue transformed data, and then performing prediction compensation.

6. The method of claim 2, wherein in the transforming of the residue by using the relation, assuming that three components of the color image are $X_1$, $X_2$, and $X_3$, and $\Delta X_1$, $\Delta X_2$, and $\Delta X_3$ are residues of $X_1$, $X_2$, and $X_3$, respectively, the transform is performed by subtracting the residue value of one component from the residue values of the remaining two component among the three components as the following equation:

$$\begin{bmatrix} \Delta^2 X_1 \\ \Delta^2 X_2 \\ \Delta^2 X_3 \end{bmatrix} = \begin{bmatrix} 1 & -10 \\ 0 & 10 \\ 1 & -10 \end{bmatrix} \begin{bmatrix} \Delta X_1 \\ \Delta X_2 \\ \Delta X_3 \end{bmatrix}$$

where $\Delta^2 X_1$, $\Delta^2 X_2$, and $\Delta^2 X_3$ are residue transformed signals.

7. The method of claim 2, wherein in the transforming of the residue by using the relation, assuming that three components of the color image are $X_1$, $X_2$, and $X_3$, and $\Delta X_1$, $\Delta X_2$, and $\Delta X_3$ are residues of $X_1$, $X_2$, and $X_3$, respectively, the transform is performed by using the following equation:

$$\begin{bmatrix} \Delta^2 X_1 \\ \Delta^2 X_2 \\ \Delta^2 X_3 \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} \Delta X_1 \\ \Delta X_2 \\ \Delta X_3 \end{bmatrix}$$

where $\Delta^2 X_1$, $\Delta^2 X_2$, and $\Delta^2 X_3$ are residue transformed signals.

8. The method of claim 2, wherein in the transforming of the residue by using the relation, assuming that three components of the color image are $X_1$, $X_2$, and $X_3$, and $\Delta X_1$, $\Delta X_2$, and $\Delta X_3$ are residues of $X_1$, $X_2$, and $X_3$, respectively, the transform is performed by using the following equations:

$$\Delta^2 X_1 = \Delta X_2 - \Delta X_3$$

$$t = \Delta X_3 + (\Delta^2 X_1 >> 1)$$

$$\Delta^2 X_3 = \Delta X_1 - t$$

$$\Delta^2 X_2 = t + (\Delta^2 X_3 >> 1)$$

where $\Delta^2 X_1$, $\Delta^2 X_2$, and $\Delta^2 X_3$ are residue transformed signals.

9. The method of claim 1, further comprising:
entropy coding the quantized data and generating a bitstream.

10. The method of claim 1, wherein the obtaining of the residue corresponding to the difference comprises:
obtaining a lossy predicted image for each component of the original image, by estimating a prediction direction from pixels spatially adjacent to the pixel block of a current frame of the color component; and
obtaining a lossy spatial residue by subtracting the lossy predicted image from the original image.

11. A non-transitory computer readable recording medium encoded with computer readable code comprising a program for implementing the method of claim 1.

12. A color image encoding method using residue transform for encoding an original color image formed with at least two or more components, the method comprising:
obtaining a residue corresponding to the difference of the original color image and a predicted image generated from a restored image, for each component of the original color image;
selecting whether or not to perform residue transform by using a relation between residues of respective components of the original color image;
if residue transform is selected, performing lossy encoding by transforming the residue using the relation between the residues of the respective components of the original color image; and
if residue transform is not selected, lossy encoding the residue of each component of the original color image.

13. The method of claim 12, wherein, in the transforming of the residue by using the relation, assuming that three components of the color image are X1, X2, and X3, and ΔX1, ΔX2, and ΔX3 are residues of X1, X2, and X3, respectively, the transform is performed by subtracting the residue value of one component from the residue values of the remaining two component among the three components.

14. A color image encoding apparatus using residue transform for encoding an original color image formed with at least two or more components, the apparatus comprising:
a spatiotemporal prediction unit for generating at least one for each component of the original color image, of a temporal predicted image by using the restored previous image and the current image, and a spatial predicted image by using a restored current image;
a residue generation unit for generating a spatial residue obtained by subtracting the spatial predicted image from the original image in a case of intra mode, and generating a temporal residue obtained by subtracting the temporal predicted image form the original image in a case of inter mode;
a residue transform unit for transforming the residue by using a relation between residues of respective components of the color image; and
a residue encoding unit for encoding the transformed residue, including at least quantization.

15. The apparatus of claim 14, further comprising:
an entropy coding unit for entropy coding the quantized data and generating a bitstream.

16. The apparatus of claim 14, wherein the spatiotemporal prediction unit comprises:
a spatial prediction unit for obtaining a predicted image of each component of the original color image in a case of intra mode, by estimating a prediction direction from restored pixels spatially adjacent to the pixel block of the current frame of each color component; and
a temporal prediction unit for obtaining a predicted image of each component of the original color image incase of inter mode, by estimating motions between the restored previous frame and the current frame of each color component in units of blocks of a predetermined size.

17. The apparatus of claim 14, wherein the predicted image of the spatiotemporal unit is generated by using an image which is restored by performing inverse quantization and inverse transform of a signal generated through transform and quantization in the residue encoding unit, and the performing prediction compensation.

18. A color image encoding apparatus using residue transform for encoding an original color image formed with at least two or more components, the apparatus comprising:
a residue generation unit for generating a residue corresponding to the difference of the original color image and a predicted image generated from a restored color image, for each component of the original color image;
a residue transform selection unit for selecting whether or not to perform residue transform by using a relation between the residues of the color image components generated in the residue generation unit;
a residue transform unit for transforming the residue by using the relation between residues of respective components of the color image if residue transform is selected in the residue transform selection unit; and
a residue encoding unit for encoding the residue transformed in the residue transform unit, or if residue transform is not selected in the residue transform unit, for encoding the residue generated in the residue generation unit, wherein the encoding includes at least quantization.

19. A non-transitory computer readable recording medium encoded with computer readable code comprising a program for implementing the method of any of claim 18.

20. A color image decoding method using residue transform for decoding an original color image formed with at least two or more encoded components, the method comprising:
- restoring residue transformed image data by performing lossy decoding on the encoded data of the original color image;
- generating the residue of each component of the color image by performing residue inverse transform of the residue transformed image data; and
- restoring the original color image by adding a predicted image generated by using the restored image, to the residue of each component.

21. The method of claim 20, wherein the original image has any one of an R-G-B format, a Y-Cb-Cr format, and an X-Y-Z format.

22. The method of claim 20, wherein in the restoring of the original color image, in a case of intra mode, the original image is restored by compensating the residue of each color component for a value spatially predicted by using pixels spatially adjacent to the pixel block of a current image.

23. The method of claim 20, wherein in the restoring of the original color image, in a case of inter mode, the original image is restored by compensating the residue of each color component for a value temporally predicted by obtaining a predicted image from the previous image.

24. The method of claim 20, wherein in the restoring of the original color image, in a case of intra mode, the original image is restored by compensating the residue of each color component for a value spatially predicted by using pixels spatially adjacent to the pixel block of a current image; and in a case of inter mode, the original image is restored by compensating the residue of each color component for a value temporally predicted by obtaining a predicted image from the previous image.

25. The method of claim 20, wherein assuming that three components of the color image are $X_1$, $X_2$, and $X_3$, and $\Delta X_1$, $\Delta X_2$, and $\Delta X_3$ are residues of $X_1$, $X_2$, and $X_3$, respectively, the residue inverse transform is performed by using the following equation:

$$\begin{bmatrix} \Delta X_1 \\ \Delta X_2 \\ \Delta X_3 \end{bmatrix} = \begin{bmatrix} 1 & 10 \\ 0 & 10 \\ 0 & 11 \end{bmatrix} \begin{bmatrix} \Delta^2 X_1 \\ \Delta^2 X_2 \\ \Delta^2 X_3 \end{bmatrix}$$

where $\Delta^2 X_1$, $\Delta^2 X_2$, and $\Delta^2 X_3$ are residue transformed signals.

26. The method of claim 20, wherein assuming that three components of the color image are $X_1$, $X_2$, and $X_3$, and $\Delta X_1$, $\Delta X_2$, and $\Delta X_3$ are residues of $X_1$, $X_2$, and $X_3$, respectively, the residue inverse transform is performed by using the following equation:

$$\begin{bmatrix} \Delta X_1 \\ \Delta X_2 \\ \Delta X_3 \end{bmatrix} = \begin{bmatrix} 1 & 1 & -1 \\ 1 & 0 & 1 \\ 1 & -1 & -1 \end{bmatrix} \begin{bmatrix} \Delta^2 X_1 \\ \Delta^2 X_2 \\ \Delta^2 X_3 \end{bmatrix}$$

where $\Delta^2 X_1$, $\Delta^2 X_2$, and $\Delta^2 X_3$ are residue transformed signals.

27. The method of claim 20, wherein assuming that three components of the color image are $X_1$, $X_2$, and $X_3$, and $\Delta X_1$, $\Delta X_2$, and $\Delta X_3$ are residues of $X_1$, $X_2$, and $X_3$, respectively, the residue inverse transform is performed by using the following equations:

$$t = \Delta^2 X_2 - (\Delta^2 X_3 >> 1)$$

$$\Delta X_1 = \Delta^2 X_3 + t$$

$$\Delta X_3 = t - (\Delta^2 X_1 >> 1)$$

$$\Delta X_2 = \Delta X_3 + \Delta^2 X_1$$

where $\Delta^2 X_1$, $\Delta^2 X_2$, and $\Delta^2 X_3$ are residue transformed signals.

28. The method of claim 20, further comprising:
- entropy decoding an input bitstream of the original color image.

29. A color image decoding method using residue transform for decoding an original color image formed with at least two or more encoded components, the method comprising:
- performing at least inverse quantization of the encoded data of the original color image;
- determining whether or not the inverse quantized data is residue transformed;
- if the data is residue transformed, performing residue inverse transform of the residue transformed image data and generating the residue of each component of the color image;
- if the data is not residue transformed, generating the residue of each component of the color image from the inverse quantized data; and
- restoring the original color image by adding a predicted image to the residue of each component.

30. A color image decoding apparatus using residue transform for decoding an original color image formed with at least two or more encoded components, the apparatus comprising:
- a residue transform data restoration unit for restoring residue transformed image data from lossy encoded data of the original color image;
- a residue inverse transform unit for performing residue inverse transform of the residue transformed data and generating the residue of each component of the color image; and
- an original color image restoration unit for restoring the original color image by adding a predicted image generated by using a restored image, to the residue of each component.

31. The apparatus of claim 30, wherein the residue transform data restoration unit further comprises:
- an entropy decoding unit for entropy decoding an encoded bitstream; and
- an inverse quantization/inverse transform unit for performing inverse quantization and inverse transform of the entropy decoded data.

32. A color image decoding apparatus using residue transform comprising:
- a lossy decoding unit for performing at least inverse quantization of a lossy encoded bitstream of a color image;
- a residue transform determination unit for extracting residue transform selection information indicating whether or not residue transform is performed, from the data lossy decoded in the lossy decoding unit, and interpreting the information;
- a residue transform data extraction unit for extracting residue transformed data from the lossy decoded data if the interpretation result of the residue transform selection information indicates that the lossy decoded data is residue transformed;

a residue inverse transform unit for performing residue inverse transform of the residue transformed data and generating the residue of each component of the color image;

a residue data extraction unit for extracting residue data from the lossy decoded data if the interpretation result of the residue transform selection information indicates that the lossy decoded data is not residue transformed; and an original color image restoration unit for restoring the original color image by adding a predicted image generated by using a restored image, to the residue of each component.

* * * * *